(12) United States Patent
Laine et al.

(10) Patent No.: US 8,462,734 B2
(45) Date of Patent: Jun. 11, 2013

(54) WIRELESS DOCKING WITH OUT-OF-BAND INITIATION

(75) Inventors: Tuomas Laine, Vantaa (FI); Andrea Bacioccola, Helsinki (FI); Jan Suumäki, Lempäälä (FI)

(73) Assignee: Nokia Corporation, Espoo (FI)

( * ) Notice: Subject to any disclaimer, the term of this patent is extended or adjusted under 35 U.S.C. 154(b) by 419 days.

(21) Appl. No.: 12/908,028

(22) Filed: Oct. 20, 2010

(65) Prior Publication Data
US 2012/0099566 A1 Apr. 26, 2012

(51) Int. Cl.
*H04W 4/00* (2009.01)
(52) U.S. Cl.
USPC ..... 370/331; 370/252; 370/310.2; 455/422.1; 709/221
(58) Field of Classification Search
USPC .... 370/252, 310.2, 328–339, 349; 455/422.1; 709/220–222, 227–229
See application file for complete search history.

(56) References Cited

U.S. PATENT DOCUMENTS

| | | | |
|---|---|---|---|
| 5,530,702 A | 6/1996 | Palmer et al. | |
| 5,842,210 A | 11/1998 | Chen et al. | |
| 6,757,531 B1 | 6/2004 | Haaramo et al. | |
| 6,816,063 B2 | 11/2004 | Kubler et al. | |
| 6,888,354 B1 | 5/2005 | Gofman | |
| 6,892,052 B2 | 5/2005 | Kotola et al. | |
| 7,075,412 B1 | 7/2006 | Reynolds et al. | |
| 7,190,981 B2 | 3/2007 | Cherian | |
| 7,471,200 B2 | 12/2008 | Otranen | |
| 7,519,682 B2 | 4/2009 | Smith et al. | |
| 7,609,312 B2 | 10/2009 | Komori et al. | |
| 7,701,958 B2 | 4/2010 | Abrol et al. | |
| 7,775,432 B2 | 8/2010 | Jalkanen et al. | |
| 7,821,399 B2 | 10/2010 | Otranen | |
| 8,210,433 B2 | 7/2012 | Jalkanen et al. | |
| 2001/0045460 A1 | 11/2001 | Reynolds et al. | |
| 2002/0012329 A1* | 1/2002 | Atkinson et al. | 370/330 |
| 2002/0021809 A1 | 2/2002 | Salo et al. | |
| 2002/0022961 A1 | 2/2002 | Sepanaho | |

(Continued)

FOREIGN PATENT DOCUMENTS

| | | |
|---|---|---|
| EP | 1630712 | 1/2006 |
| EP | 1633104 | 8/2006 |

(Continued)

OTHER PUBLICATIONS

European Search Report dated Jan. 27, 2012 for Application No. EP 11181733.4-2412.

(Continued)

*Primary Examiner* — Hoon J Chung
(74) *Attorney, Agent, or Firm* — Locke Lord LLP

(57) ABSTRACT

Example method, apparatus, and computer program product embodiments are disclosed to enable out-of-band communications to be used in out-of-band initialization methods for simplified configuring of an in-band wireless docking environment for wireless devices. An example embodiment of the invention includes composing a wireless configuration for a plurality of devices in an in-band short-range wireless docking environment, by using out-of-band connections from a mobile device to the plurality of devices to send in-band short-range communication connection parameters including a timer value related to an expected completion time of a connection handover to in-band short-range communication.

20 Claims, 16 Drawing Sheets

U.S. PATENT DOCUMENTS

| | | | |
|---|---|---|---|
| 2002/0023264 | A1 | 2/2002 | Aaltonen et al. |
| 2002/0069406 | A1 | 6/2002 | Aaltonen et al. |
| 2002/0087997 | A1 | 7/2002 | Dahlstrom |
| 2002/0191998 | A1 | 12/2002 | Cremon et al. |
| 2003/0043041 | A1 | 3/2003 | Zeps et al. |
| 2003/0084177 | A1 | 5/2003 | Mulligan |
| 2003/0097304 | A1 | 5/2003 | Hunt |
| 2003/0120745 | A1 | 6/2003 | Katagishi et al. |
| 2003/0134653 | A1 | 7/2003 | Sarkkinen et al. |
| 2004/0193676 | A1 | 9/2004 | Marks |
| 2004/0203413 | A1 | 10/2004 | Harumoto |
| 2004/0225199 | A1 | 11/2004 | Evanyk et al. |
| 2006/0003768 | A1* | 1/2006 | Chiou ............................ 455/436 |
| 2007/0001853 | A1 | 1/2007 | Otranen |
| 2007/0123316 | A1 | 5/2007 | Little |
| 2007/0168440 | A1 | 7/2007 | Cobelens |
| 2008/0146151 | A1 | 6/2008 | Lyu et al. |
| 2008/0195788 | A1 | 8/2008 | Tamir et al. |
| 2008/0248751 | A1 | 10/2008 | Pirzada et al. |
| 2008/0253331 | A1* | 10/2008 | Gupta et al. .................. 370/331 |
| 2009/0197604 | A1* | 8/2009 | Gupta et al. .................. 455/436 |
| 2009/0222659 | A1 | 9/2009 | Miyabayashi et al. |
| 2009/0227282 | A1* | 9/2009 | Miyabayashi et al. ...... 455/552.1 |
| 2009/0271519 | A1 | 10/2009 | Helvick |
| 2009/0276439 | A1 | 11/2009 | Rosenblatt et al. |
| 2010/0056123 | A1* | 3/2010 | Julian et al. ................... 455/418 |
| 2010/0057969 | A1 | 3/2010 | Meiri et al. |
| 2010/0197224 | A1 | 8/2010 | Lahdenniemi et al. |
| 2010/0211785 | A1 | 8/2010 | Park et al. |
| 2010/0260069 | A1 | 10/2010 | Sakamoto et al. |
| 2012/0169473 | A1 | 7/2012 | Jalkanen et al. |

FOREIGN PATENT DOCUMENTS

| | | | |
|---|---|---|---|
| WO | 00/67221 | | 11/2000 |
| WO | 01/45319 | A1 | 6/2001 |
| WO | 01/52179 | A2 | 7/2001 |
| WO | 02/11074 | A2 | 2/2002 |
| WO | 2006/106393 | A2 | 10/2006 |
| WO | WO 2006/130063 | A1 * | 12/2006 |
| WO | 2007/001629 | A2 | 1/2007 |

OTHER PUBLICATIONS

U.S. Appl. No. 13/088,621, filed Apr. 18, 2011, Suumäki et al.
NFc Forum Connection Handover Technical Specification NFC Forum TM Conection handover 1.1 NFCForum-TS-ConnectionHandover_1.1, Nov. 6, 2008, 43 pp.
NFC Forum; Connection Handover, Technical Specification NFC Forum TM: Connection Handover 1.2; NFCForum-TS-ConnectionHandover_1_2.doc; Jul. 7, 2010, 27 pp.
"W-Fi Certified™ for Wi-Fi Protected Setup™: Easing the User Experience for Home and Small Office Wi-Fi® Networks", 2207, 2008, 2009, Wi-Fi Alliance, pp. 1-14.
Wi-Fi Simple Configuration Technical Specification, Version 2.0, 2010 Wi-Fi Alliance, 154 pp.
Wi-Fi Peer-to-Peer (P2P) technical Specification, Wi-Fi Alliance Technical Committee P2P Task Group, Version 1.1, 2010 Wi-Fi Alliance, 159 pp.
Radio Frequency Identification RFID—A basic primer; AIM Inc. White Paper; Aug. 23, 2001, the Association of the Automatic Identification and Data Capture Industry (AIM Inc.); WP-98/002R2, 17 pp.
Notice and Filing of Opposition in European Patent 1 685 689, 11 pp.
Reply to Notice of Opposition in European Patent 1 685 689, 11 pp.
Office Action for Korean Application No. 10-2006-7009441 dated Apr. 23, 2007.
Notice of Allowance for Korean Application No. 10-2006-7009441 dated Jan. 7, 2008.
U.S. Appl. No. 13/198,984, filed Aug. 5, 2011, Suumäki et al.
U.S. Appl. No. 12/908,037, filed Oct. 20, 2010, Suumäki et al.
International Search Report dated Jul. 20, 2011 for PCT International Application No. PCT/FI2011/050281.
J. Suomalainen et al., "Standards for Security Associations in Personal Networks: A Comparative Analysis", International Journal of Security and Networks, vol. 4, Nos. 1-2, 2009, pp. 87-100.
Wu, et al., "An Ubiquitous Data Delivery System in Hybrid Wireless Environments", Proceedings of the 2010 International Conference on P2P, Parallel, Grid, Cloud and Internet Computing, 2010, pp. 230-234.
European Search Report for EP Application No. 08006467.8-2412 / 1965555 dated Nov. 2, 2011.
International Search Report and Written Opinion mailed Oct. 19, 2012 for International Application Serial No. PCT/FI2012/050577, 14 pp.
NFC Digital Protocol Candidate Technical Specification, NFC Forum TM, NFCForum-TS-Digital Protocol—Apr. 3, 2009.
NFC Activity Specification Candidate Technical Specification, NFC ForumTM, NFCForum-TS Activity-1.0_Candidate-1, Mar. 12, 2010.
NFC Forum Connection Handover Technical Specification NFC Forum TM Connection Handover 1.1 NFCForum-TS-ConnectionHandover_1.1; Nov. 6, 2008.
NFC Forum; Logical Link Control Protocol; Technical Specification NFC Forum TM; LLCP 1.0; NFCForum-TS-LLCP 1.0: NFCForum-TS-LLCP_1.0; Dec. 11, 2009.
NFC Forum; NFC Data Exchange Format (NDEF) Technical Specification: NFC Forum TM; NDEF 1.0; NFCForum-TS-NDEF_1.0; Jul. 24, 2006.
WiFi Alliance; Wi-Fi Protected Setup Specification Version 1.0h; Dec. 2006.
WiFi Alliance; WiFi Configuration Specification Version 2.0 r42 unofficial draft-01; Feb. 9, 2010.
Widmer, Peter, "Smart Box Software Framework," Vision Document, Jul. 4, 2003, 23pp.

* cited by examiner

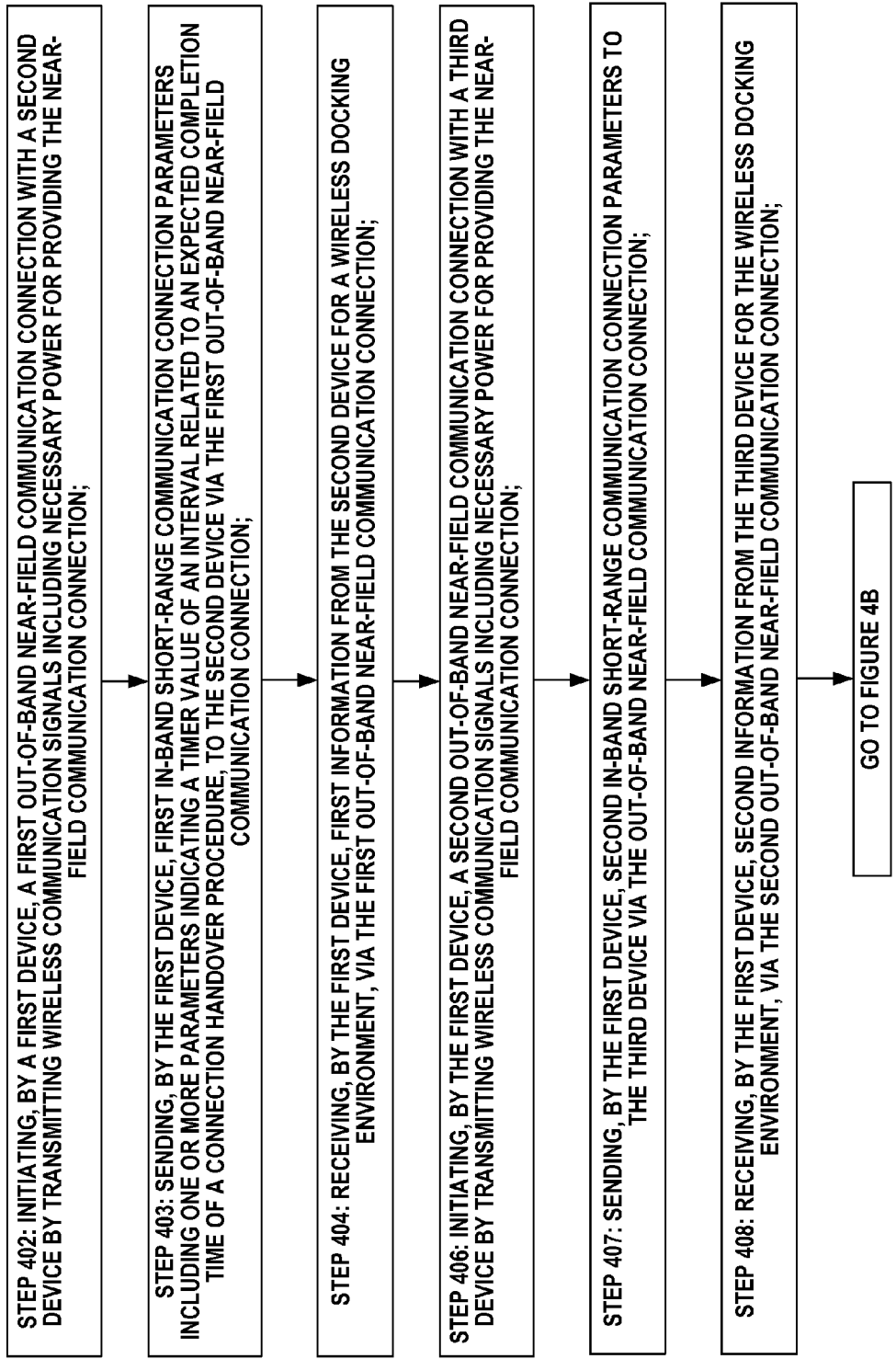

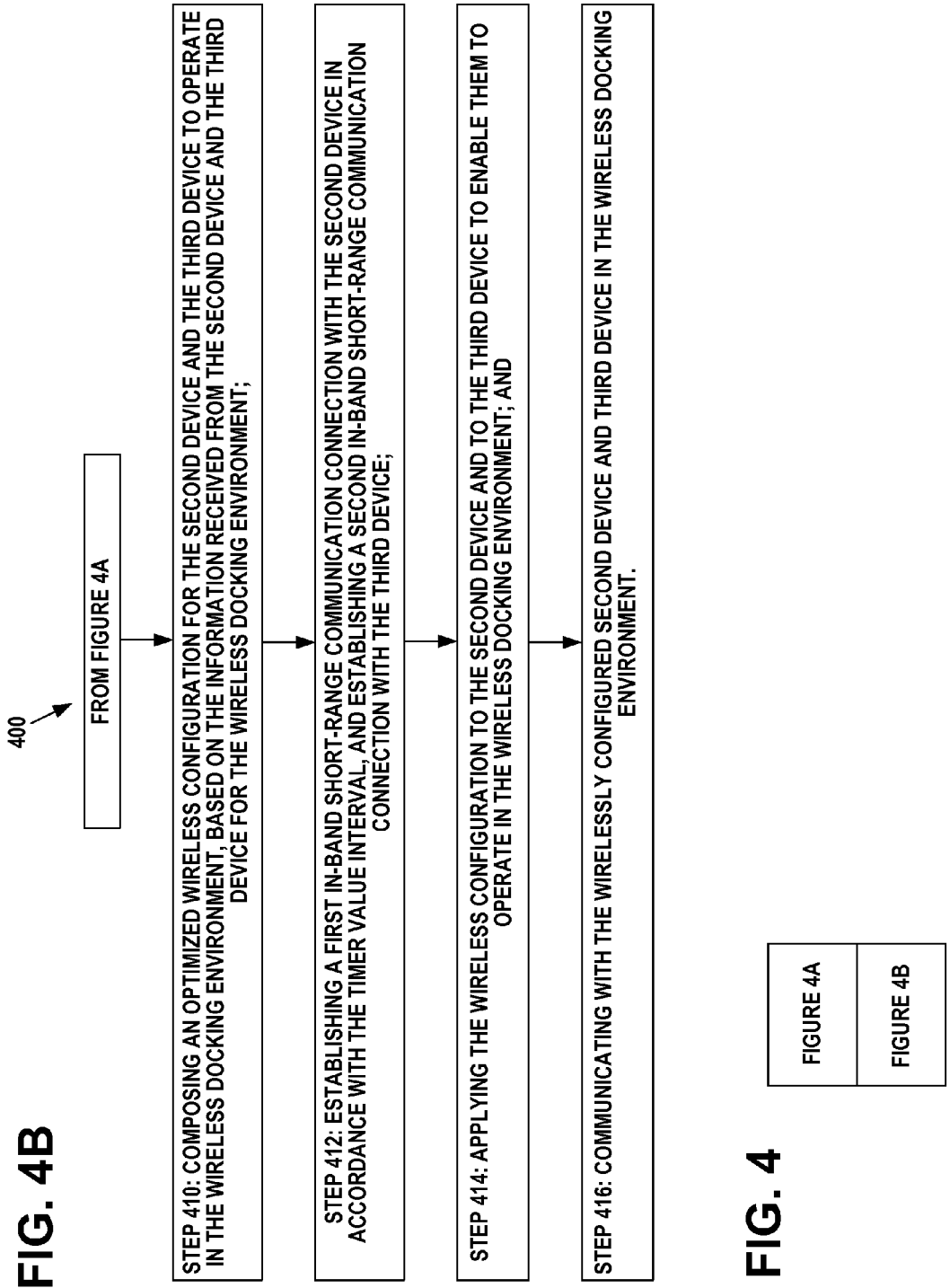

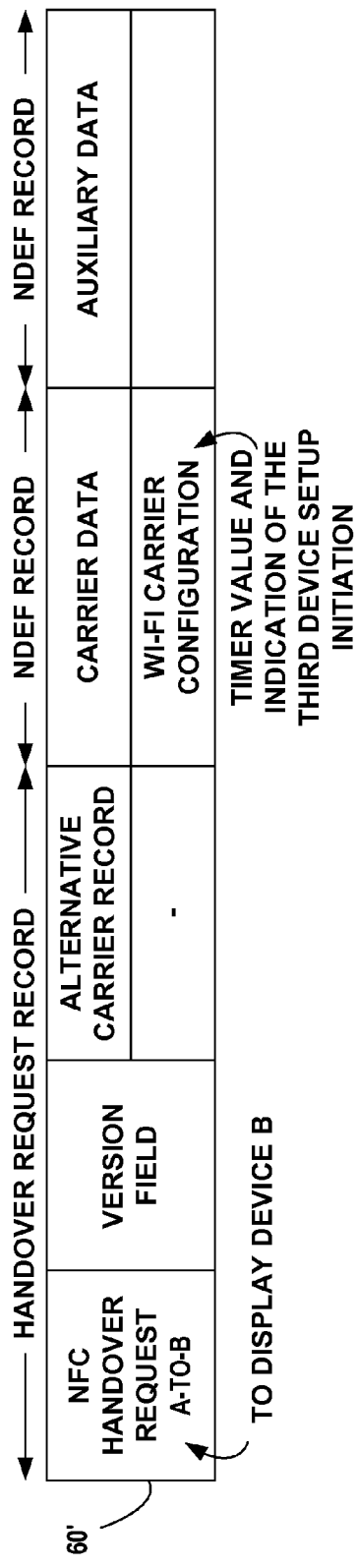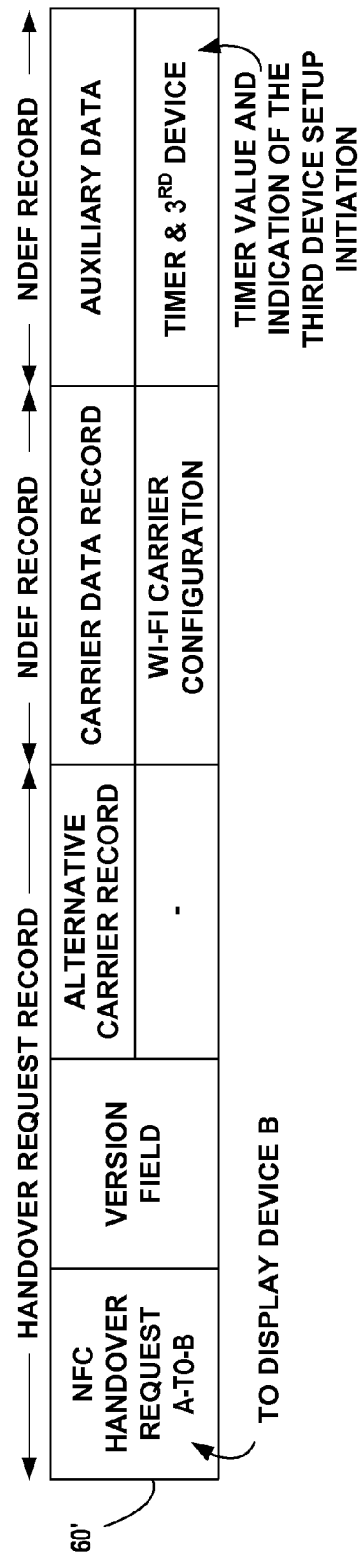

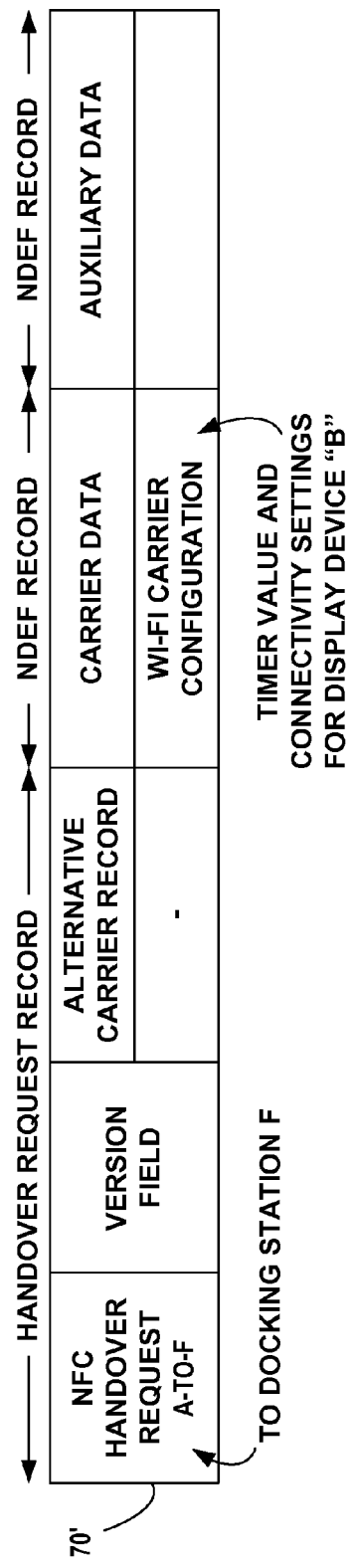
FIG. 8B1
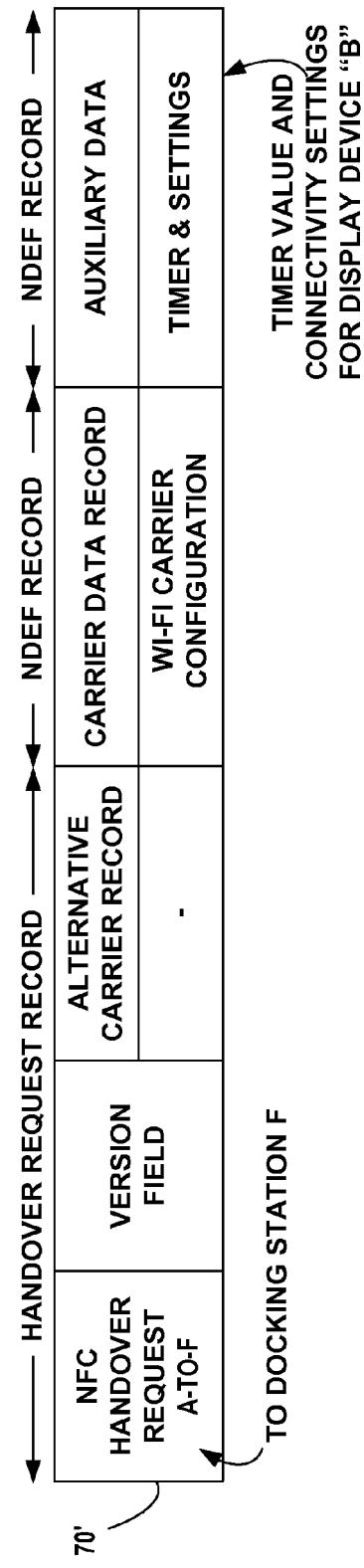
FIG. 8B2

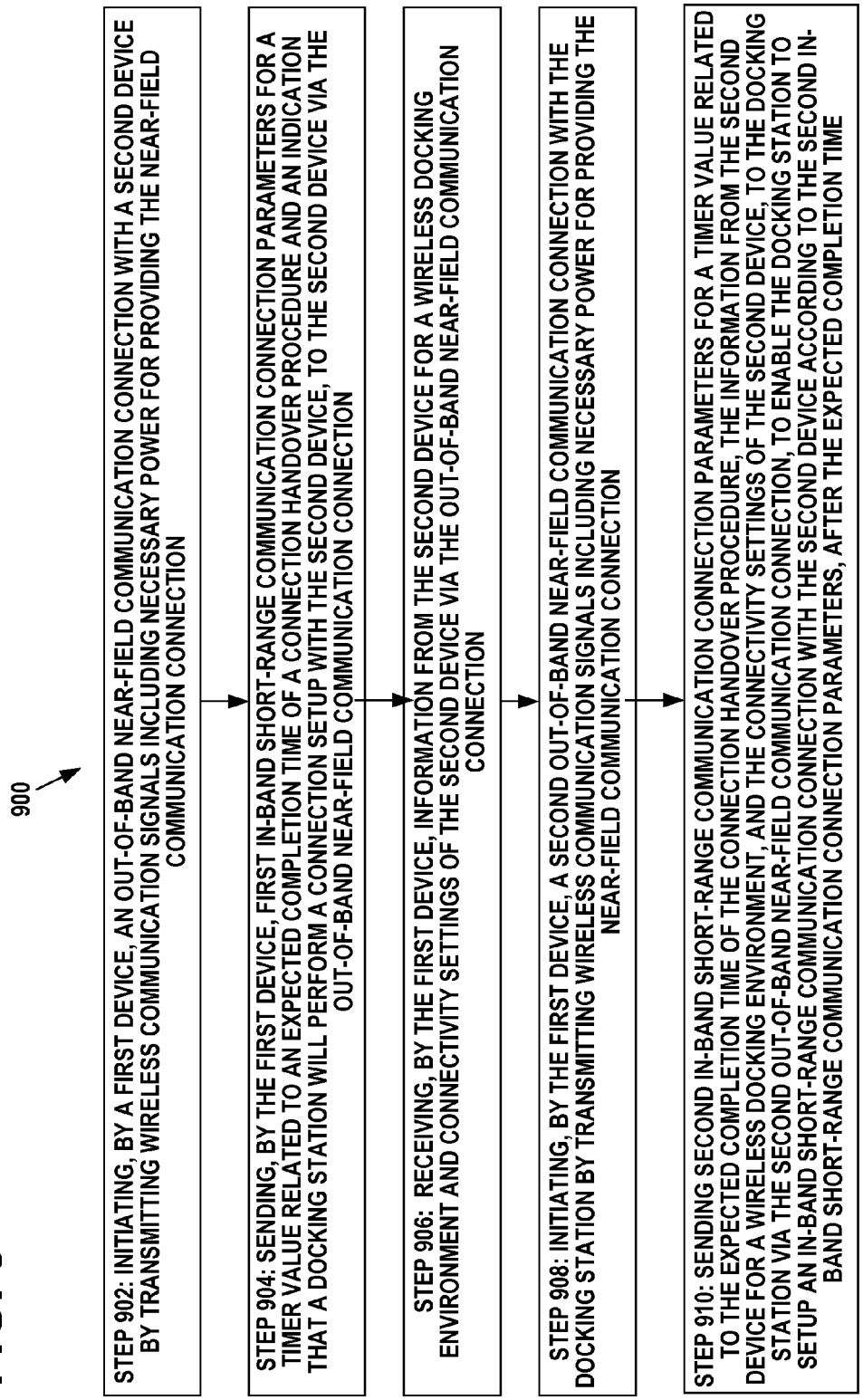

WIRELESS DOCKING WITH OUT-OF-BAND INITIATION

FIELD

The field of the invention relates to wireless communication, and more particularly to out-of-band initialization of a wireless docking environment.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

Near field communication technologies, such s radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection, which is then compatible with other known wireless technologies, such as Bluetooth™ or wireless local area network (WLAN).

Traditionally, docking station hardware has been used to plug in a laptop computer for use as a desktop computer, and to directly connect it with peripherals such as a monitor, keyboard, and other common peripherals. Currently there are no standards for configuring an entire wireless docking environment. An individual peripheral may be wirelessly connected to a mobile device by means of manual configuration. However, manually configuring a mobile device with multiple peripherals in a wireless docking environment, including wireless device discovery, selection, and connectivity setup, is a cumbersome task requiring technical expertise and may generally the result in a less than optimal wireless connectivity between the devices.

SUMMARY

Method, apparatus, and computer program product embodiments are disclosed to enable near-field communication to be used in out-of-band initialization methods for simplified configuring of a wireless docking environment for wireless devices.

An example embodiment of the invention includes a method comprising the steps of initiating out-of-band connections by a mobile wireless device to a plurality of wireless devices;

sending, by the mobile wireless device, in-band wireless short-range communication connection parameters over one or more of the out-of-band connections, including a timer value related to an expected completion time of a connection handover to in-band wireless short-range communication;

receiving, by the mobile wireless device, information from the plurality of wireless devices regarding a wireless docking environment, via the out-of-band connections; and composing a configuration for the plurality of devices in a wireless docking environment based on the in-band short-range communication connection parameters and the information regarding the wireless docking environment.

An example embodiment of the invention further comprising a method for distributed docking, wherein the mobile device performs the step of composing the optimal wireless configuration for the plurality of devices to enable them to operate in a distributed wireless docking environment.

An example embodiment of the invention further comprising the steps of:

sending, by the mobile device, an indication that a another device will perform a connection setup with one or more of the plurality devices, via the out-of-band connection;

receiving, by the mobile device, connectivity settings from the one or more of the plurality devices, via the out-of-band connection;

initiating, by the mobile device, another out-of-band connection with the another device; and sending by the mobile device, in-band short-range communication connection parameters including one or more parameters indicating a timer value related to the expected completion time of the connection handover, the information from the plurality devices for a wireless docking environment, and the connectivity settings, to the another device via the another out-of-band connection, to enable the another device to setup in-band short-range communication connections with the plurality of devices according to the in-band short-range communication connection parameters, after the expected completion time.

An example embodiment of the invention further comprising a method for centralized docking at a docking station device, wherein the mobile device performs the step of composing the optimal wireless configuration for the plurality of devices to enable them to operate in a distributed wireless docking environment.

In an example embodiment of the invention, a computer program product comprising computer executable program code recorded on a computer readable storage medium, the computer executable program code, when executed by a computer processor, performing the steps in the example methods recited above.

In an example embodiment of the invention, a device, comprises:

at least one processor;

at least one memory including computer program code;

the at least one memory and the computer program code configured to, with the at least one processor, cause the device at least to:

initiate by the device as a mobile wireless device, out-of-band connections to a plurality of wireless devices;

send, by the mobile wireless device, in-band wireless short-range communication connection parameters over one or more of the out-of-band connections, including a timer value related to an expected completion time of a connection handover to in-band wireless short-range communication;

receive, by the mobile wireless device, information from the plurality of wireless devices regarding a wireless docking environment, via the out-of-band connections; and compose a configuration for the plurality of devices in a wireless docking environment based on the in-band short-range communication connection parameters and the information regarding the wireless docking environment.

An example embodiment of the invention includes a method for centralized docking at a docking station device, comprising the steps of:

forming, by a wireless docking station device, an out-of-band connection with a mobile wireless device;

receiving, by the wireless docking station device, first in-band short-range communication connection parameters for a timer value related to an expected completion time of a connection handover, connectivity settings of a second device, and information from the second device for a wireless docking environment, from the wireless mobile device via the out-of-band connection, to enable setting up a first in-band short-range communication connection with the second device according to the first in-band short-range communication connection parameters, after the expected completion time;

receiving, by the wireless docking station device, second in-band short-range communication connection parameters, connectivity settings of a third device, and information from the third device for a wireless docking environment, from the mobile device via the out-of-band connection, to enable setting up a second in-band short-range communication connection with the third device according to the second in-band short-range communication connection parameters;

composing, by the wireless docking station device, a wireless configuration for the mobile device, the second device, and third device to operate in a wireless docking environment, based on the information from the second device and the third device for the wireless docking environment;

establishing, by the wireless docking station device a first in-band short-range communication connection with the second device in accordance with the timer value interval, and a second in-band short-range communication connection with the third device;

applying, by the wireless docking station device, the wireless configuration to the second device and the third device to enable them to operate in the wireless docking environment; and communicating, by the wireless docking station device, with the wirelessly configured second and third devices in the wireless docking environment.

The resulting example embodiments enable near-field communication to be used in out-of-band initialization methods for simplified configuring of a wireless docking environment for wireless devices.

DESCRIPTION OF THE FIGURES

FIG. 4, consisting of FIGS. 4A and 4B, is an example flow diagram 400 of operational steps of an example embodiment of the method carried out between the mobile device 100A, the display device 100B, and the mouse device 100C of FIG. 2A to form a distributed wireless docking environment, from the point of view of the mobile device 100A sending to display device 100B.

FIG. 8A1 is an example embodiment NFC handover request message format from the mobile device A to the display device B, with the additional WLAN parameters including one or more parameters indicating a timer value related to an expected completion time of a connection handover procedure and an indication that a third device will perform a connection setup with the second device 100B in the carrier configuration NDEF record, sent by the mobile device A over the NFC link, according to an embodiment of the present invention. The expected completion time may be a maximum time the display device may keep its radio on to enable accepting incoming connection requests, according to an embodiment of the present invention.

FIG. 8A2 is an example embodiment NFC handover request message format from the mobile device A to the display device B with the additional WLAN parameters including one or more parameters indicating the timer value and indication of the third device setup initiation in the auxiliary data NDEF record, sent by the mobile device A over the NFC link, according to an embodiment of the present invention.

FIG. 8B1 is an example embodiment NFC handover request message format from the mobile device A to the wireless docking station device F with the additional WLAN parameters including one or more parameters indicating a timer value related to an expected completion time of a connection handover procedure and connectivity settings of the second device that the wireless docking station device F will use to perform a connection setup with the display device B in the carrier configuration NDEF record, sent by the mobile device A over the NFC link, according to an embodiment of the present invention.

FIG. 8B2 is an example embodiment NFC handover request message format from the mobile device A to the wireless docking station device F with the additional WLAN parameters including one or more parameters indicating the timer value and connectivity settings of device in the auxiliary data NDEF record, sent by the mobile device A over the NFC link, according to an embodiment of the present invention.

FIG. 9 is an example flow diagram of operational steps of an example embodiment of the method carried out between the mobile device A, the display device B, and the docking station F of FIG. 2A and FIG. 6 to form a centralized wireless docking environment, operating in the example sequence shown in FIG. 7, from the point of view of the mobile device A.

DISCUSSION OF EXAMPLE EMBODIMENTS OF THE INVENTION

Figure 1:
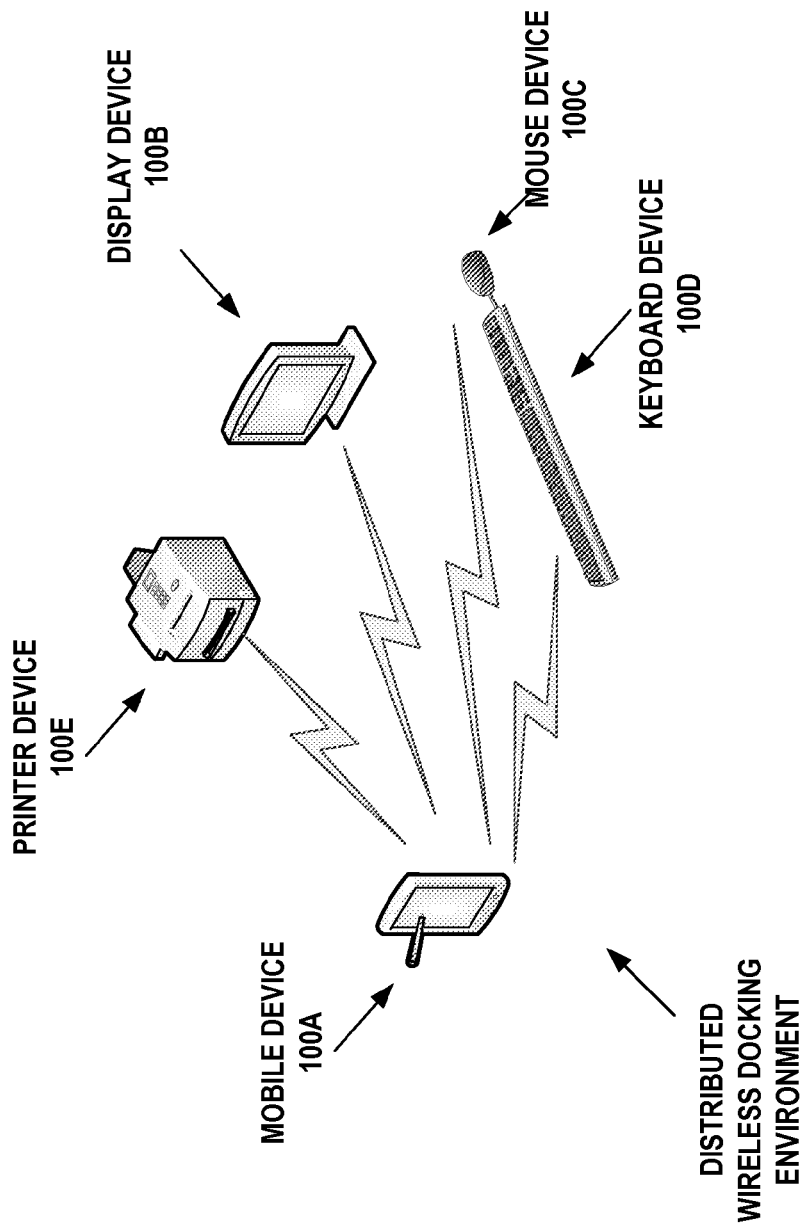
FIG. 1 is a wireless network diagram of an example embodiment of a distributed wireless docking environment, wherein mobile device A is both the dockee and the docking controller in the distributed wireless docking environment with display B, mouse C, Keyboard D, and printer E.

Wi-Fi refers to the family of related IEEE 802.11 specifications that specify methods and techniques of wireless local area network (WLAN) operation. Examples include the IEEE 802.11b and 802.11g wireless local area network specifications, which have been a staple technology for traditional Wi-Fi applications in the 2.4 GHz ISM band. Emerging broadband applications have stimulated interest in developing very high-speed wireless networks for short range communication, for example, the IEEE 802.11n, the planned IEEE 802.11ac, and the planned IEEE 802.11ad WLAN specifications that are to provide a very high throughput in higher frequency bands. Wi-Fi applications include 802.11 products such as consumer electronics, telephones, personal computers, and access points for both for home and small office.

In an example application of Wi-Fi, a wireless router may be connected through a cable modem or DSL modem to the Internet and serves as a wireless access point for personal computers equipped with a wireless network interface card and for other wireless devices such as wireless repeaters using a Wi-Fi standard. Setting up a wireless router Wi-Fi network includes configuring the nodes of the network with security features enabled by the Wi-Fi network standard.

The Wi-Fi Alliance published the Wi-Fi Protected Setup (WPS) specification 1.0, *Wi-Fi Protected Setup Specification*, Version 1.0 h, December 2006 (incorporated herein by reference), to facilitate the initial setting up of 802.11 devices in a Wi-Fi infrastructure network so that they may be more easily configured with security features and so that that new Wi-Fi devices may be added to the network. One of the methods provided by the Wi-Fi Protected Setup (WPS) Specification 1.0 is the Near-Field Communication (NFC) method, in which the user brings a new wireless client device (STA) close to an access point (AP) or Registrar of the Network to allow near field communication between the devices.

Near-field communication (NFC) technology used in the Wi-Fi Protected Setup (WPS) standard, communicates between two NFC Devices or between an NFC Device and an NFC Tag via magnetic field induction, where two loop antennas are located within each other's near field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The NFC radio may be affixed to a new wireless client device (STA) and the user brings the NFC radio on the device close to an access point (AP) or Registrar of the Network to allow near field communication between the devices. NFC technology is an extension of the ISO/IEC 14443 proximity-card standard (incorporated herein by reference) for contactless smartcards and radio frequency ID (RFID) devices, which combines the interface of a contactless smartcard and a reader into a single device, and uses the ISO/IEC 18092 NFC communication standard (incorporated herein by reference) to enable two-way communication. An NFC radio may communicate with both existing ISO/IEC 14443 contactless smartcards and readers, as well as with other NFC devices by using ISO/IEC 18092. The NFC Forum™, a non-profit industry association, has released specifications that enable different operation modes called: tag emulation, read/write mode, and peer to peer communication. Furthermore, NFC Forum has defined specifications for NFC Data Exchange Format (NDEF), NFC Tag Types, NFC Record Type Definition, and Connection Handover Specification. See, for example, *Connection Handover Technical Specification*, NFC Forum™, Connection Handover 1.1, NFCForum-TS-ConnectionHandover_1.1, Dec. 6, 2008 (incorporated herein by reference). The ISO/IEC 18092 standard defines communication modes for Near Field Communication Interface and Protocol (NFCIP-1) using inductively coupled devices operating at the center frequency of 13.56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

The WPS 1.0 standard defines three types of components in a network: a Registrar, an Enrollee, and an Access Point (AP). A Registrar is a component with the authority to issue and revoke credentials to a network. A Registrar may be integrated into an AP or it may be separate from the AP. An Enrollee is a component seeking to join a wireless LAN network. An Authenticator is an AP functioning as a proxy between a Registrar and an Enrollee. A Registrar wireless device configures the Enrollee wireless device, and the AP acts as an Authenticator to proxy the relevant messages between the Registrar and the Enrollee. The messages exchanged in the session are a series of Extensible Authentication Protocol (EAP) request/response messages, ending with the Enrollee reconnecting to the network with its new configuration. EAP is an authentication framework defined in RFC 5247, for providing the transport and usage of keying material and parameters needed to establish a secure Wi-Fi network.

The Wi-Fi Protected Setup (WPS) 1.0 specification published by the Wi-Fi Alliance, *Wi-Fi Protected Setup Specification*, Version 1.0 h, December 2006, defines a near-field communication (NFC) setup method for IEEE 802.111 WLAN Infrastructure setup that includes an access point (AP), and is currently the only official WPS specification. The access point (AP) defines the roles of registrar and enrollee for the requesting device and the selecting device. The Wi-Fi Protected Setup (WPS) 2.0 specification (to be published) updates the NFC setup method for WLAN Infrastructure mode that includes an access point (AP). Current WLAN device-to-device technologies include the IEEE 802.11 IBSS (Ad Hoc), Wi-Fi networks, and Bluetooth.

The basic handover to a Wi-Fi carrier stores wireless LAN parameters and credentials on NFC Forum Tags as part of its Wi-Fi Protected Setup (WPS) specification 1.0. The information is stored in the payload of an NFC Data Exchange Format (NDEF) record identified by the mime-type "application/vnd.wfa.wsc", known as the "WPS Record". The wireless LAN parameters and credentials information provided inside a WPS Record includes the IEEE 802.11 Service Set Identifier (SSID), authentication and encryption type deployed by the wireless network, the secret network key that a wireless station needs to authenticate with the network, and the MAC address of the device receiving the configuration (if unknown, this address is set to all-zeros). The WPS specification 1.0 uses the term "Registrar" for a device that is able to provide WLAN credentials and "Enrollee" for a device that wants to join a wireless network.

In the WPS specification 2.0 (to be published), a Handover Requester with Wi-Fi capability may format an NFC Handover Request Message in the NFC Data Exchange Format (NDEF), that indicates that the requester is an IEEE 802.11 device, but which does not include any configuration information. A Handover Request may be sent via the NFC link in at least two scenarios: [1] the requester may not have yet joined a wireless domain or [2] even if the requester is already member of a WLAN network, a peer device may be in different network and thus a Connection Handover is required to obtain the peer device's credentials. In the WPS specification 2.0, the Handover Selector would deduce from this message that the Handover Requester supports a Wi-Fi certified IEEE 802.11 radio. In the WPS specification 2.0, if the Handover Selector is a Wi-Fi device with wireless connectivity, it should respond with an NFC Handover Select Message in the NFC Data Exchange Format (NDEF), with a configuration record that includes credentials, such as network index, SSID, authentication type, encryption type, network key, and MAC address.

The NFC Data Exchange Format (NDEF) specification, *NFC Forum Data Exchange Format (NDEF) Specification*, NFC Forum™, 2006 (incorporated herein by reference), defines a common data format for NFC devices to exchange application or service specific data. An NDEF message is constructed of a number of NDEF records, with the first and the last record providing message begin and end markers. Between two NFC Devices, NDEF messages may be exchanged over the NFC Logical Link Control Protocol (LLCP) protocol, specified in *NFC Forum Logical Link Control Protocol Specification*, NFC Forum™, 2009 (incorporated herein by reference). The NFC Connection Handover specification, *NFC Forum Connection Handover Specification*, NFC Forum™, 2008 (incorporated herein by reference), defines the exchange of NDEF messages between two NFC Devices in a negotiated handover to discover and negotiate alternative wireless communication technologies.

The Handover Requester in the WPS specification 2.0, would then typically use the SSID and Network Key to enroll on the same Wi-Fi network to which the Handover Selector is connected. Further possible actions depend on the provision of an IP address identifying the Handover Selector, the available services, and the Handover Requester's intended activity.

The Wi-Fi Alliance has developed a new WLAN device-to-device specification, as yet unpublished, named Wi-Fi Direct, referred to herein as Wi-Fi Peer-to-Peer or Wi-Fi P2P. Wi-Fi P2P enables IEEE 802.11a, g, or n devices to connect to one another, point-to-point, without prior setup or the need for wireless access points. Wi-Fi P2P embeds a software access point into any device, which provides a version of Wi-Fi Protected Setup. When a device enters the range of the Wi-Fi P2P host, it can connect to it using the existing ad-hoc protocol, and then gather setup information using a Wi-Fi Protected Setup transfer. Devices that support Wi-Fi P2P may discover one another and advertise available services. Wi-Fi P2P devices support typical Wi-Fi ranges and the same data rates as can be achieved with an 802.11a, g, or n infrastructure connection. When a device enters the range of the Wi-Fi P2P host, it may connect to it using the existing protocol, and then gather setup information using a Wi-Fi Protected Setup 1.0 transfer.

The method, apparatus, and computer program product embodiments disclosed herein enable near-field communication to be used in out-of-band initialization methods for simplified configuring of a wireless docking environment for wireless devices.

Example Wireless Docking Environments

Wireless docking is referred as connecting a mobile device to a group of peripheral devices wirelessly. Typical peripherals include e.g. display, input devices (mouse, keyboard, touch-screen), mass storage, printer etc.

The following terms used herein to describe example features of a wireless docking environment, according to an embodiment of the invention:
Docking Environment:
 a group of peripherals that belong together.
 a docking environment may be configured by:
  adding, or removing, peripherals from the docking environment needs deliberate action
 a dockee may expect to automatically connect with all peripherals that are available in the environment.
Dockee:
 a portable product (e.g. smart phone, netbook, laptop, camera) that is brought into the docking environment and uses the peripherals.
Docking Station:
 a device that coordinates the setup of connections between Dockee and all peripherals in the environment
 in addition it may also provide the connection between Dockee and legacy peripherals
Wireless Docking Peripheral:
 a peripheral that implements the wireless docking standard e.g. mouse, keyboard, USB hard drive, webcam, display, . . .

The wireless docking environment consists of the following components:
 Mobile device
 Docking controller
 Arbitrary number of peripheral devices An example wireless docking architecture may be one of the following or a combination of them:
 Centralized wireless docking
  The mobile device (i.e., the Dockee) communicates with the docking controller (i.e., the Docking Station)
  The docking controller (i.e., the Docking Station) communicates with the peripherals.
 Distributed wireless docking
  The docking controller functionality is implemented in the mobile device (i.e., the Dockee) and the peripheral devices are independently connected to the mobile device, for example in a star topology. In this architecture there is no physical Docking Station.

An example embodiment of the invention optimizes connectivity within a wireless docking environment in the following example phases:

1) Collect comprehensive information about the docking environment by performing an NFC touch of all peripheral devices with the mobile device. The touch operation refers to an interaction between the mobile device and a peripheral using RFID/NFC technology.
2) Use the collected information to compose an optimal overall wireless configuration for the docking environment.
3) Apply the required changes to the docking environment.

Example Distributed Wireless Docking Environments

FIG. 1 is a wireless network diagram of an example embodiment of a distributed wireless docking environment, wherein mobile device 100A is both the dockee and the docking controller in the distributed wireless docking environment, with display 100B, mouse 100C, Keyboard 100D, and printer 100E.

The Mobile Device 100A is both the dockee the docking controller. The Mobile Device 100A supports WLAN (Wi-Fi), Bluetooth, NFC (NFC Device) and Docking Protocol.

The Display device 100B, a peripheral, supports Video and audio over Wi-Fi, NFC (NFC Device) and Docking Protocol.

The Mouse device 100C, a peripheral, supports Bluetooth NFC (NFC tag) and Docking Protocol.

The Keyboard device 100D, a peripheral, supports Bluetooth; NFC (NFC tag) and Docking Protocol.

The Printer device E, a peripheral, supports Printing over Wi-Fi, NFC (NFC tag) and Docking Protocol.

Figure 2A:
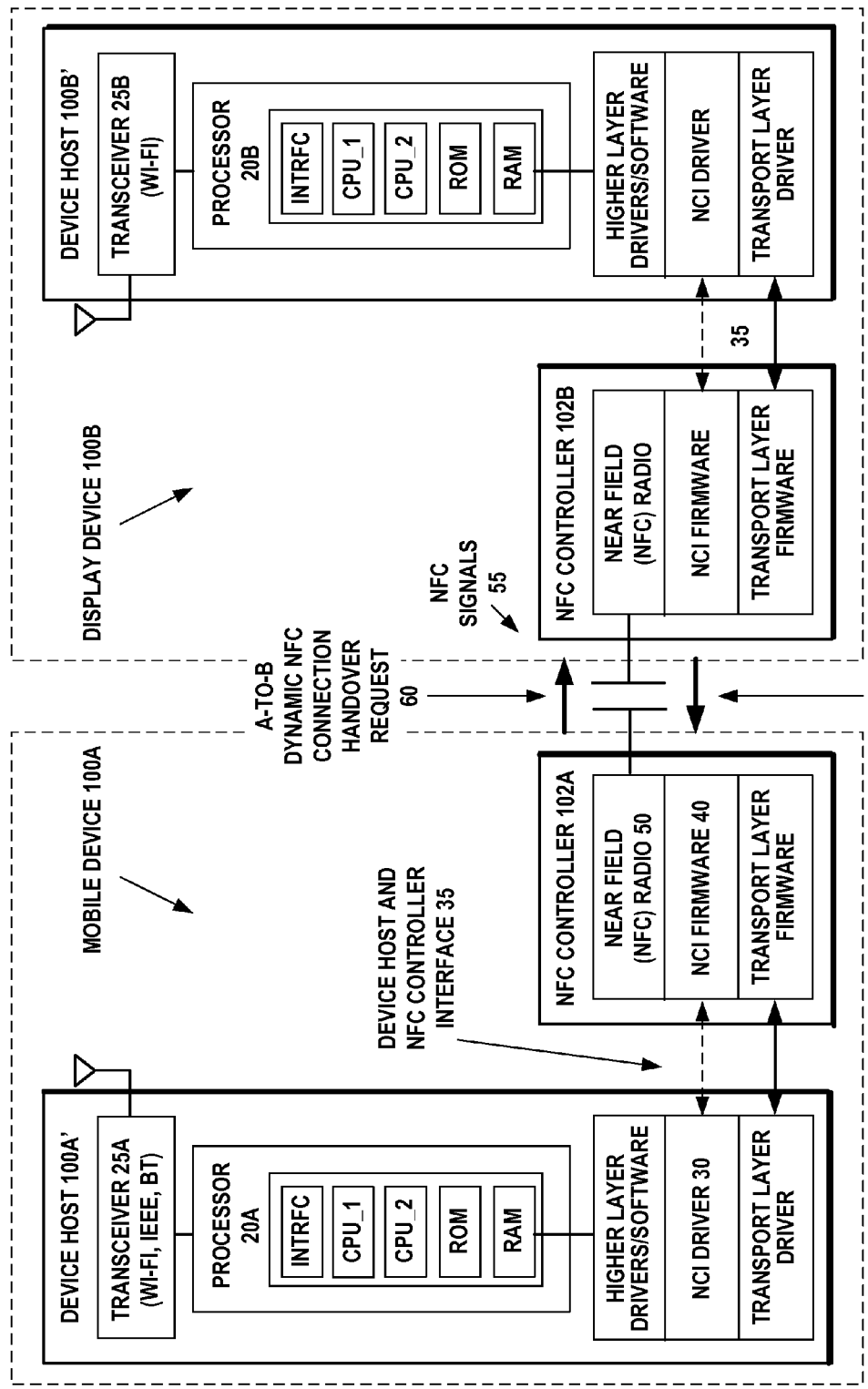
FIG. 2A is an example embodiment of the distributed wireless docking environment of FIG. 1, illustrating an example of the mobile device A comprising a mobile device host and its associated NFC controller sending a dynamic NFC connection handover request to an example of the display device B comprising a display device host and its associated NFC controller, performing a dynamic handover procedure to a Wi-Fi Peer-to-Peer (P2P) short-range communication connection, by using near-field communication (NFC) signals in an out-of-band device-to-device connection setup. The NFC connection handover request includes short-range communication connection parameters including one or more parameters indicating a timer value related to an expected completion time of a connection handover procedure. The expected completion time may be a maximum time the display device may keep its radio on to enable accepting incoming connection requests, according to an embodiment of the present invention.

FIG. 2A is an example embodiment of the distributed wireless docking environment of FIG. 1, illustrating an example of the mobile device 100A comprising a mobile device host 100A' and its associated NFC controller 102A sending a dynamic NFC connection handover request 60 to an example of the display device 100B comprising a display device host 100B' and its associated NFC controller 102B, performing a dynamic handover procedure to a Wi-Fi short-range communication connection, by using near-field communication (NFC) signals 55 in an out-of-band device-to-device connection setup, according to an embodiment of the present invention.

The NFC handover request message 60 from the mobile device 100A to the display device 100B includes additional WLAN parameters including one or more parameters indicating a timer value related to an expected completion time of a dynamic connection handover procedure. In an example embodiment of the invention, the expected completion time may be a maximum time the display device 100B may keep its radio on to enable accepting incoming connection requests, according to an embodiment of the present invention. In another example embodiment of the invention, the timer value may also specify the minimum time after which the connection may be initiated by a third device. The display device 100B may share the WLAN short-range communication medium with another peripheral device, such as the printer device 100E, and thus both devices must coordinate their use of the WLAN medium. Since the printer device 100E and the display device 100B may not receive their respective NFC connection handover request messages at the same time, they are both delayed in completing the handover procedure in accordance with the expiration of the minimum time represented by the timer value in the handover request 60.

The display device host 100B' and its associated NFC controller 102B replies with a handover select 62 with Wi-Fi settings and credentials. An example embodiment of the WLAN (Wi-Fi), Bluetooth, NFC (NFC Device) and Docking Protocol programs may be computer code instructions stored in the RAM and/or ROM memory of the processor 20A in the mobile device 100A, which when executed by the central processing units (CPU), carry out the functions of the example embodiments of the invention. The mobile device host 100A' includes a transceiver 25A capable of handling, for example, Wi-Fi, IEEE 802.11 WLAN, and Bluetooth communication protocols. The host device 100A' may be, for example a communications device, PDA, cell phone, laptop or palmtop computer, or the like. The host device 100B' may be, for example, a flat panel display.

The mobile device host 100A' includes a processor 20, which includes a dual core central processing unit (CPU_1 and CPU_2), a random access memory (RAM), a read only memory (ROM), and interface circuits to interface with one or more radio transceivers, battery and other power sources, key pad, touch screen, display, microphone, speakers, ear pieces, camera or other imaging devices, etc. in the mobile device host 100A'. The RAM and ROM can be removable memory devices such as smart cards, SIMs, WIMs, semiconductor memories such as RAM, ROM, PROMS, flash memory devices, etc. The NCI driver 30 in mobile device host 100A' communicates over the Device Host and NFC Controller interface 35 with the NCI firmware 40 in the NFC controller 102A via the transport layer driver in mobile device host 100A' and the transport layer firmware in NFC controller 102A.

Figure 2B:
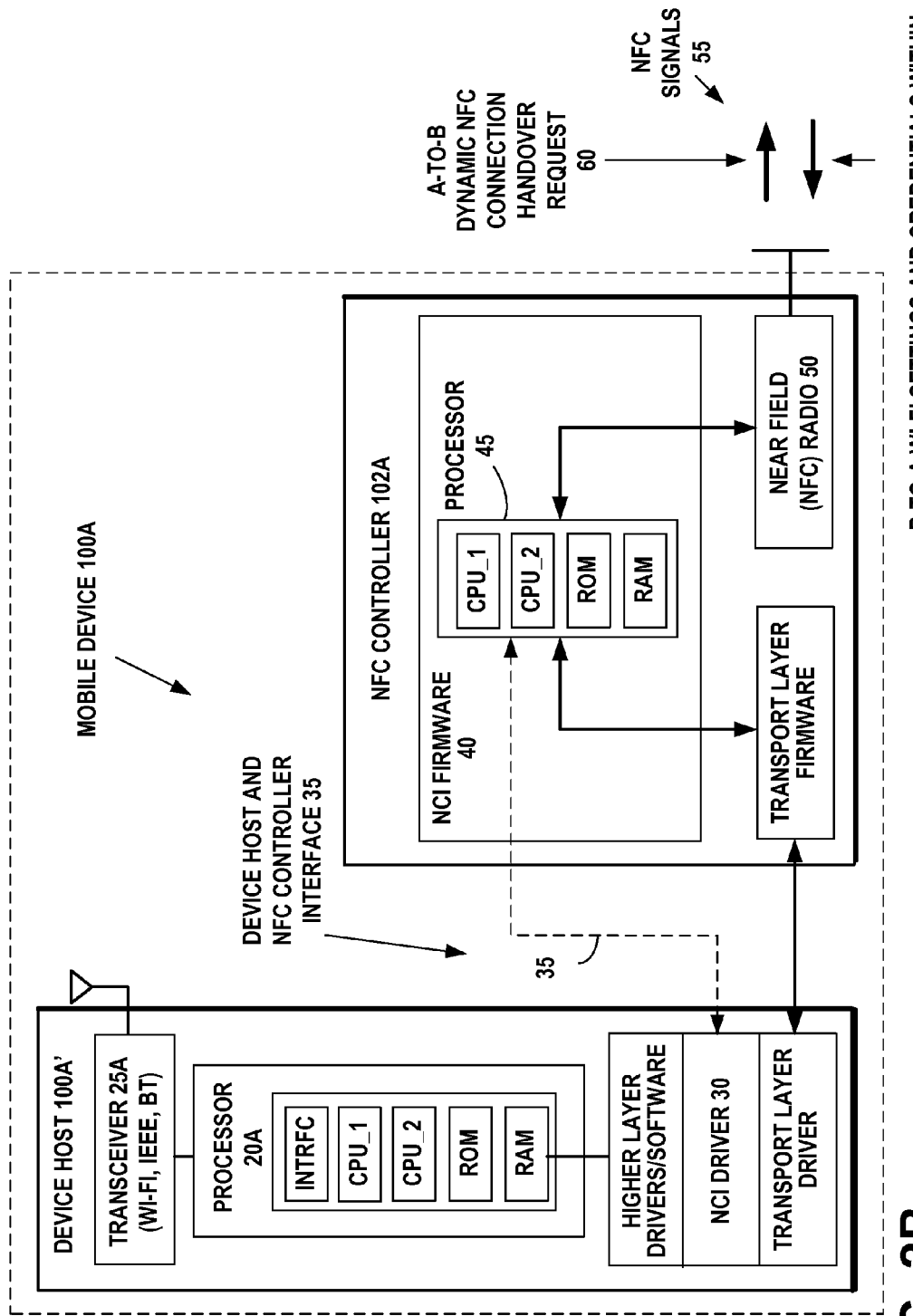
FIG. 2B is an example embodiment of the mobile device A of FIG. 2A comprised of the mobile device host coupled to its associated NFC controller via the Device Host and NFC Controller interface 35, showing a more detailed view of the NCI firmware in the NFC controller, according to an embodiment of the present invention.

FIG. 2B is an example embodiment of the mobile device 100A of FIG. 2A comprised of the mobile device host 100A' coupled to its associated NFC controller 102A via the Device Host and NFC Controller interface 35, showing a more detailed view of the NCI firmware 40 in the NFC controller 102A, according to an embodiment of the present invention. An example embodiment of the Docking Protocol and NCI firmware 40 programs may be computer code instructions stored in the RAM and/or ROM memory of the processor 45 in the NFC controller 102A, which when executed by the central processing units (CPU), carry out the functions of the example embodiments of the invention.

The NFC controller 102A may be embodied as hardware, software, firmware, or a combination of these constructs. It may be an integral part of the mobile device host 100A' or it be an integrated circuit chip or card physically attached to the mobile device host 100A', such as with a flash card adapter. In an example embodiment, the NFC controller 102A includes a processor 45, which includes a dual core central processing unit (CPU_1 and CPU_2), a read only memory (ROM), and random access memory (RAM). The NFC controller 102A may include the NFC radio 50 or the NFC radio 50 may be separately connected. The NFC controller 102A may include its own battery or it may use power supplied by the host device 100A. The ROM and/or RAM may be a removable memory device such as a smart card, SIM, WIM, semiconductor memory such as RAM, ROM, PROMS, flash memory devices, etc.

NCI firmware 40 in the NFC controller 102A communicates bidirectionally with the NFC controller 102B via magnetic field induction, where two loop antennas are located within each other's near-field, effectively energizing a wireless contact by forming an air-core transformer. An example NFC radio 50 operates within the unlicensed radio frequency ISM band of 13.56 MHz, with a bandwidth of approximately 2 MHz over a typical distance of a few centimeters. The user may bring the NFC radio 50 on the NFC controller 102A close to the NFC controller 102B of the second host device 100B to allow near-field, bidirectional communication between the devices. NFC technology is an extension of the ISO/IEC 14443 proximity-card standard for contactless smartcards and radio frequency ID (RFID) devices, which combines the interface of a contactless smartcard and a reader into a single device, and uses the ISO/IEC 18092 NFC communication standard to enable two-way communication. An NFC radio may communicate with both existing ISO/IEC 14443 contactless smartcards and readers, as well as with other NFC devices by using ISO/IEC 18092.

When two NFC controllers 102A and 102B are brought into close proximity, they may establish NFC communication based on the NFC Forum Logical Link Control Protocol (LLCP) specification. In example embodiments of the invention, the NFC controller 102A may be a contactless smartcard reader having characteristics similar to those described in the ISO/IEC 14443 proximity-card standard, the smartcard and reader being associated or combined as a single component capable of two-way communication, and may use the ISO/IEC 18092 NFC communication standard.

Figure 2C:
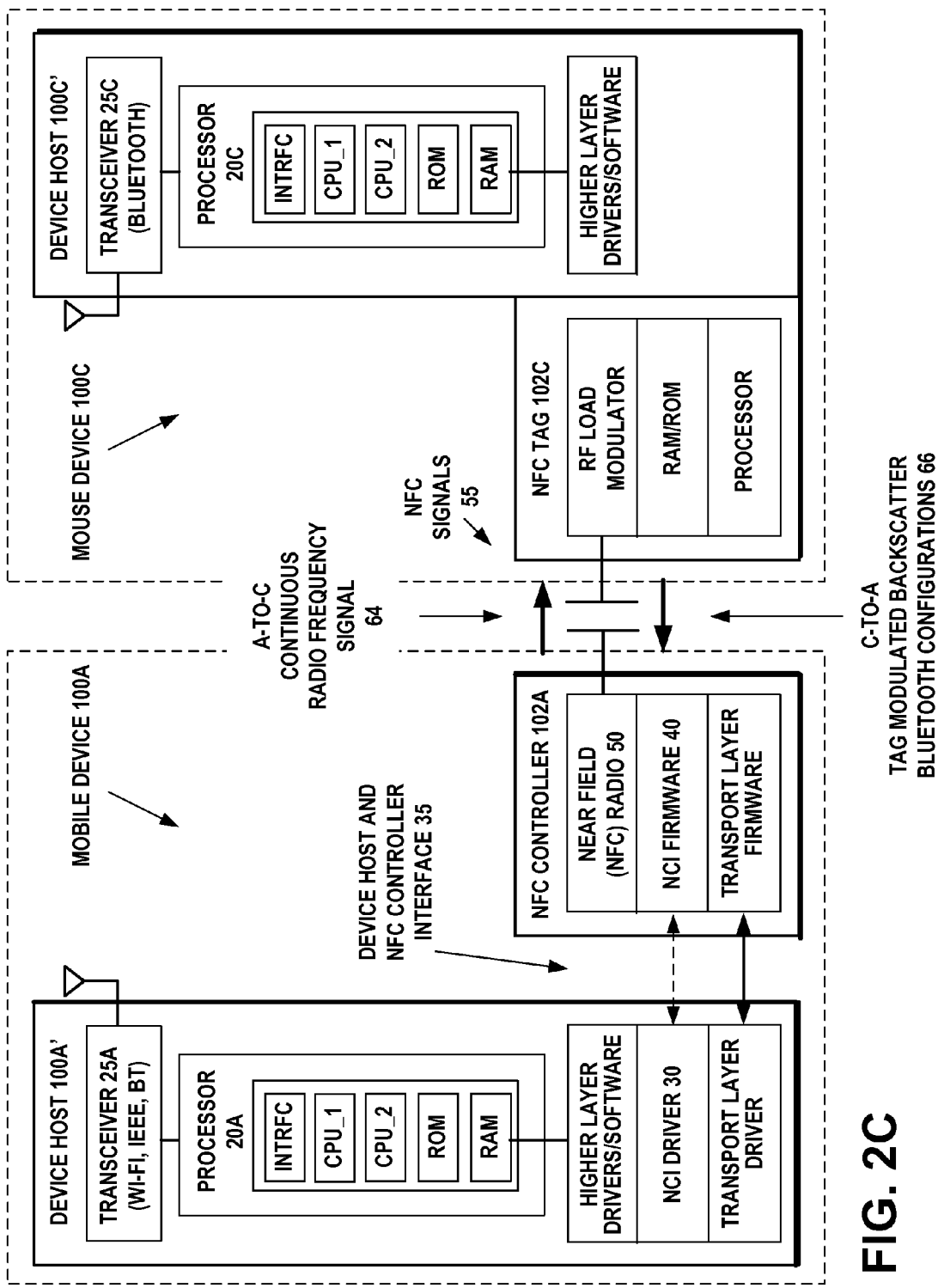
FIG. 2C is an example embodiment of the distributed wireless docking environment of FIG. 1, illustrating an example of the mobile device A comprising a mobile device host and its associated NFC controller sending a continuous radio frequency signal to an example of the mouse device C comprising a mouse device host and its associated NFC tag, to initiate a static handover procedure to a Bluetooth short-range communication connection, by using near-field communication (NFC) signals in an out-of-band device-to-device connection setup, according to an embodiment of the present invention.

FIG. 2C is an example embodiment of the distributed wireless docking environment of FIG. 1, illustrating an example of the mobile device 100A comprising a mobile device host 100A' and its associated NFC controller 102A sending a continuous radio frequency signal 64 to an example of the mouse device 100C comprising a mouse device host 100C' and its associated NFC tag 102C, to initiate a static handover procedure to a Bluetooth short-range communication connection, by using near-field communication (NFC) signals 55 in an out-of-band device-to-device connection setup, according to an embodiment of the present invention. The NFC tag 102C requires no internal power source to communicate with the NFC controller 102A, and is only active when it is near an NFC controller transmitting a continuous radio frequency signal. The continuous radio frequency signal 64 energizes the NFC tag 102C at a resonant frequency of the antenna of the NFC tag 102C. A small electrical current induced in the antenna of the NFC tag 102C by the continuous radio frequency signal provides enough power for the integrated circuit RAM/ROM and processor in the NFC tag 102C to power up and transmit a modulated response 66, typically by back-scattering the continuous carrier wave received from the RFID reader. The modulated response 66 includes Bluetooth configuration data of the transceiver 25C of the mouse device host 100C'. The NFC Tag 102C may send an NFC Connection Handover Select message with Bluetooth configurations.

The Keyboard device 100D has a similar keyboard device host and associated NFC tag to that of mouse device 100C. The mobile device 100A may send a similar continuous radio frequency signal 64, to an example of the keyboard device 100D, to initiate a static handover procedure to a Bluetooth short-range communication connection, by using near-field communication (NFC) signals in an out-of-band device-to-device connection setup, according to an embodiment of the present invention. The NFC Tag may send an NFC Connection Handover Select message with Bluetooth configurations.

The printer device 100E has a similar keyboard device host and associated NFC tag to that of mouse device 100C. The mobile device 100A may send a similar continuous radio frequency signal 64, to an example of the printer device 100E, to initiate a static handover procedure to a Wi-Fi short-range communication connection, by using near-field communication (NFC) signals in an out-of-band device-to-device connection setup, according to an embodiment of the present invention. The NFC Tag may send an NFC Connection Handover Select message with Wi-Fi configurations.

Figure 3A:
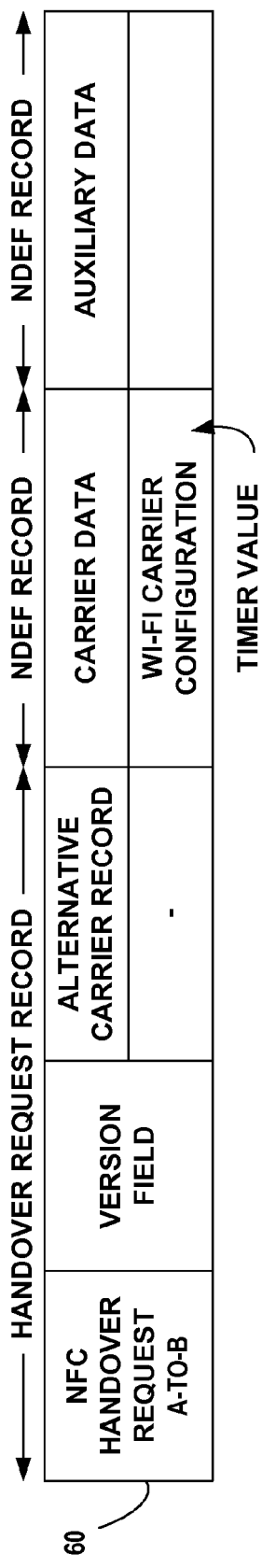
FIG. 3A is an example embodiment NFC handover request message format from the mobile device A to the display device B with the additional WLAN parameters including one or more parameters indicating a timer value related to an expected completion time of a dynamic connection handover procedure in the carrier configuration NDEF record, sent by the mobile device A over the NFC link, according to an embodiment of the present invention.

FIG. 3A is an example embodiment NFC handover request message 60 format from the mobile device 100A to the display device 100B with the additional WLAN parameters including one or more parameters indicating a timer value related to an expected completion time of a dynamic connection handover procedure in the carrier configuration NDEF record, sent by the mobile device 100A over the NFC link 55, according to an embodiment of the present invention. In some scenarios the timer value may need to be updated between consecutive NFC touches. For example if the timer value is set to 100 second in a first touch, then if a second consecutive touch is performed 10 seconds later, the timer value may need to be adjusted accordingly, for example to 90 seconds. Such an adjustment may need to be done on a case-by-case basis, depending on hoe the timer is actually used.

Figure 3B:
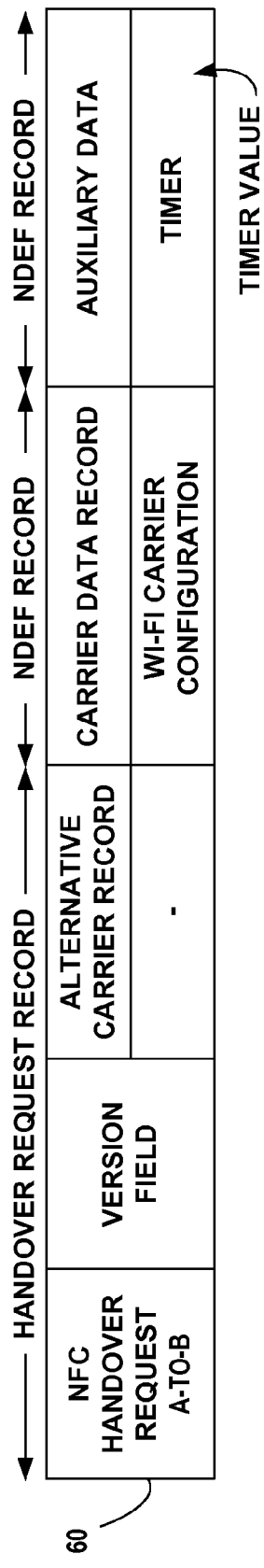
FIG. 3B is an example embodiment NFC handover request message format from the mobile device A to the display device B with the additional WLAN parameters including one or more parameters indicating the timer value in the auxiliary data NDEF record, sent by the mobile device A over the NFC link, according to an embodiment of the present invention.

FIG. 3B is an example embodiment NFC handover request message 60 format from the mobile device 100A to the display device 100B with the additional WLAN parameters including one or more parameters indicating the timer value in the auxiliary data NDEF record, sent by the mobile device 100A over the NFC link 55, according to an embodiment of the present invention.

In operation, the mobile device host 100A' may create a distributed wireless docking environment including three or more devices, for example the mobile device 100A, display 100B, and mouse 100C. The mobile device host 100A' may request that the NFC controller 102A to initiate a first NFC out-of-band near-field communication connection with the display device 100B of FIG. 2A by transmitting wireless communication signals 55 including necessary power for providing the near-field communication connection. The mobile device host 100A' may further request that the NFC controller 102A to initiate a second NFC out-of-band near-field communication connection with the mouse device 100C of FIG. 2C by transmitting wireless communication signals 55 including necessary power for providing the near-field communication connection.

The NFC controller 102A then sends first NFC short-range communication connection parameters in a dynamic NFC connection handover request message 60, for example settings for Wi-Fi and parameters including one or more parameters indicating a timer value of an interval related to an expected completion time of a connection handover procedure, to the NFC controller 102B of the display device host 100B' via the first NFC out-of-band near-field communication connection. The NFC controller 102A then sends continuous radio frequency signal 64 to the NFC Tag 102C of the mouse device host 100C' via the second NFC out-of-band near-field communication connection.

The NFC controller 102A of the mobile device host 100A' then receives from the NFC controller 102B of the display device host 100B' Wi-Fi settings and credentials and information for a wireless docking environment, via the NFC out-of-band near-field communication connection.

The NFC controller 102A of the mobile device host 100A' then receives from the NFC Tag 102C of the mouse device host 100C' Bluetooth settings and credentials and information for a wireless docking environment, in the form of tag modulated backscatter Bluetooth configurations 66.

The mobile device 100A then composes an optimum wireless configuration for both the display device 100B and the mouse device 100C, to operate in the wireless docking environment, based on the information from both the display device 100B and the mouse device 100C for the wireless docking environment. The wireless configuration is composed based on knowledge of the whole docking environment, not an individual peripheral. Example factors used by mobile device 100A in the composition of the wireless configuration include the relative data rate and minimum packet size requirements of the various components in their respective Wi-Fi and Bluetooth networks. For example, the distributed wireless docking environment shown in FIG. 1 includes three components in the Wi-Fi network: the mobile device 100A, the display 100B, and the printer 100E. The Wi-Fi data packet size, for example, may be optimally allocated between the mobile device, the display, and the printer based on their expected data rates and minimum packet size, where the display 100B's data rate and minimum packet size may be much greater than the printer 100E's data rate and minimum packet size. The distributed wireless docking environment shown in FIG. 1 includes three components in the Bluetooth network: the mobile device 100A, the mouse 100C, and the keyboard 100D. Bluetooth network bandwidth, for example, may be optimally allocated between the mobile device 100A, mouse 100C, and keyboard 100D based on their respective data rates and minimum packet sizes, where the mouse 100C's data rate and minimum packet size may be greater than the keyboard 100D's data rate and minimum packet size. These and other factors such as power consumption, may be considered in optimizing the distributed wireless docking environment.

The composing of an optimum wireless configuration may make use of a higher level protocol. In an example embodiment of the invention, the Universal Plug and Play (UPnP) protocol may be used. Universal Plug and Play (UPnP) is a networking architecture that provides compatibility among networking equipment, software and peripherals of vendors who belong to the Universal Plug and Play Forum. UPnP was published as International Standard, ISO/IEC 29341, in December, 2008, incorporated herein by reference. In an example embodiment of the invention, each peripheral device 100B, 100C, 100D, and 100E, the mobile device 100A, and any docking station 100F, may include a UPnP capability. A UPnP compatible device from any vendor may dynamically join a network, obtain an IP address, announce its name, and convey its capabilities upon request. A UPnP control point, such as the mobile device 100A, is a control device that is capable of discovering and controlling client devices, such as peripheral devices 100B, 100C, 100D, and 100E, and docking station 100F, in a network through a program interface, in an example embodiment of the invention.

The UPnP protocol includes the steps of discovery, description, control, event notification, and presentation. In an example embodiment of the invention, after the user touches the NFC antenna of the NFC controller 102A of the mobile device 100A to one of the peripherals, for example the NFC antenna of the NFC controller 102B of the display device 100B, and then transmits the dynamic NFC connection handover request 60. The display device 100B responds by transmitting the dynamic settings and credentials within connection handover select 62, which may include an IP address of the display device 100B and information on its type (i.e., a display), its manufacturer, and its model. Alternately, if the NFC antenna of the NFC controller 102A of the mobile device 100A touches the NFC antenna of the NFC Tag 102C of the mouse device 100C, and transmits a continuous radio frequency signal 64, the tag modulated backscatter configurations 66 may include an IP address of the mouse device 100C and information on its type (i.e., a mouse), its manufacturer, and its model. The NFC Tag 102C may send an NFC Connection Handover Select message with Bluetooth configurations. In an example embodiment of the invention, the UPnP networking discovery may be based on this IP address returned by the peripheral device in the NFC select 62 or backscatter 64. Some basic information may be included directly in the NFC Connection Handover messages. Full device description with a UPnP format may not by possible to send over the NFC link, because of the size of the description, but a URL address to the actual location of the device description may be used, instead.

When a device, such as peripheral devices 100B, 100C, 100D, and 100E, and docking station 100F, is added to the network, the UPnP discovery protocol allows that device to advertise its services to control points on the network, such as the mobile device 100A. Similarly, when a control point is added to the network, the UPnP discovery protocol allows that control point to search for devices of interest on the network. The exchange in both cases is a discovery message containing essential information about the device or one of its services, for example, its type, identifier, and a pointer to more detailed information. The UPnP discovery protocol is based on the Simple Service Discovery Protocol (SSDP).

In an example embodiment of the invention, the peripheral device may advertise its type (i.e., display, printer, mouse, keyboard, etc.) to the control point, such as the mobile device 100A. In an example embodiment of the invention, after the mobile device 100A control point has discovered a peripheral device, the mobile device 100A may retrieve the device's description from a URL address provided by the peripheral device in the discovery message. For each service, the description includes a list of the commands, or actions, to which the service responds. The peripheral may give a description of its capabilities in a UPnP device discovery message to the mobile device 100A, including carrier type (i.e., Wi-Fi, Bluetooth), data rate requirements, message formats, and the like. The capabilities may also be obtained by the mobile device 100A accessing a server on the Internet and doing a lookup using the peripheral device's manufacturer and model number information as search keys.

In an example embodiment of the invention, the mobile device 100A may arrange the capability characteristics of two or more peripherals it has touched, into a table, for example arranging carrier type in a column, data rate in another column, and minimum packet length in a third column. As part of the optimization, for all of the devices using a Wi-Fi carrier, which are to be composed into the docking network, for example the display 100B, printer 100E, and mobile device 100A, the mobile device 100A may allocate a packet size for each of the display 100B and the printer 100, according to their respective data rates and minimum packet size. The mobile device 100A does the same thing for all of the devices using a Bluetooth carrier, which are to be composed into the docking network, for example the mouse 100C, keyboard 100D, and mobile device 100A. The mobile device 100A may allocate a packet size for each of Bluetooth devices, the mouse 100C and the keyboard 100D, according to their respective data rates and minimum packet sizes. The mobile device 100A then assigns a carrier packet length/message length to each peripheral device 100B, 100C, 100D, and 100E, and docking station 100F, based on the packet size allocated for each respective peripheral device and docking station. This allocation of carrier packet lengths/message lengths according to the respective data rates and minimum packet sizes of the peripheral devices and docking station optimizes the wireless configuration for the wireless docking station environment.

For example, the display 100B and the printer 100E share the Wi-Fi carrier, whose packets are based on the IEEE 802.11 MAC. The overhead preamble and trailer fields of such packets typically are on the order of 50 octets in length, which may vary with levels of compression, security, and error correction included in the packets. A typical display 100B may have a screen buffer of 1024 lines of 1024 bytes per line, each byte representing a pixel. Data transfers between the mobile device 100A and the display 100B may be in units of lines of display at 1024 bytes each. The packet for a display line may be 1024 plus the header of 50 octets, which is on the order of 1100 octets for a display line-packet. The transmission of display line-packets to the display may be periodic at a rate of 1024 lines per picture frame, without compression. There may be a maximum of 30 picture frames sent to the display per second when continuous changes in the depicted scenes, if there were no compression applied to the images, such as MPEG compression. This results in a maximum data rate for the transmissions to the display, without compression, of 30 Mbytes/sec. The ratio of the payload to overhead for a display line-packet is approximately 20 to 1. All of this information is included in the capability characteristics of the display 100B sent to the mobile device 100B. This is compared to a typical printer 100E's characteristics, where the printer is a black and white printer with a resolution of 600 dots per inch and a page printed area of 8 by 10 inches. Data transfers between the printer 100E and the mobile device 100A may be in units of lines of print at 4800 bits or 600 octets each. The packet for a display line may be 600 plus the header of 50 octets, which is on the order of 650 octets for a printer line-packet. The transmission of printer line-packets to the printer may be periodic at a rate of 600 lines per page, without compression. This results in a maximum data rate for the transmissions to the printer, without compression, of 0.36 Mbytes/sec. The ratio of the payload to overhead for a printer line-packet is approximately 10 to 1. All of this information is included in the capability characteristics of the display 100B sent to the mobile device 100B.

In an embodiment of the invention, as part of the optimization, for the display and printer devices using the Wi-Fi carrier, which are to be composed into the docking network, the mobile device 100A may allocate packet size for each of the display 100B and the printer 100, according to their respective data rates and minimum packet length. Based on the example of the display 100B and printer 100E, the mobile device 100A may double the packet size for the printer packets based on respective ratios of payload to overhead. Based on the relative ratio of the payload to overhead for a printer line-packet of 10 to 1 versus ratio of the payload to overhead for a display line-packet of 20 to 1, the bandwidth of the Wi-Fi carrier may be more efficiently used if the packet length for the printer line-packets is increased by at least a factor of two. Thus, in an embodiment of the invention, the mobile device 100A assigns a larger packet length to the printer device 100E, to optimize the composition of the wireless docking environment.

The mobile device 100A then assigns a carrier packet length/message length to each peripheral device 100B, 100C, 100D, and 100E, and docking station 100F, based on the packet size allocated for each respective peripheral device and docking station. This allocation of carrier packet lengths/message lengths according to the respective data rates and minimum packet lengths of the peripheral devices and docking station optimizes the wireless configuration for the wireless docking station environment.

Other factors, such as power dissipation of each peripheral device, may be considered in the optimization of the wireless docking environment.

The mobile device 100A then establishes a Wi-Fi short-range communication connection with the display device 100B in accordance with the timer value interval, and establishes a Bluetooth short-range communication connection with the mouse device 100C.

The mobile device 100A then applies the wireless configuration via the Wi-Fi network, to both the display device 100B and to the mouse 100C to enable them to operate in the wireless docking environment. The mobile device 100A then applies the respective assigned carrier packet length/message length to each peripheral device 100B, 100C, 100D, and 100E, and docking station 100F, based on the packet size allocated for each respective peripheral device and docking station. Thus, in the above example embodiment of the invention, the mobile device 100A applies a larger packet length to the printer device 100E, to optimize the composition of the wireless docking environment.

The mobile device 100A then is able to communicate via the Wi-Fi network, with each peripheral device 100B, 100C, 100D, and 100E, and docking station 100F in the optimally composed wireless docking environment.

FIG. 4, consisting of FIGS. 4A and 4B, is an example flow diagram 400 of operational steps of an example embodiment of the method carried out between the mobile device 100A, the display device 100B, and the mouse device C of FIG. 2A to form a distributed wireless docking environment, from the point of view of the mobile device 100A sending to display device 100B, short-range communication connection parameters including one or more parameters indicating a timer value related to an expected completion time of a connection handover procedure, via the NFC out-of-band near-field communication connection. The mobile device 100A composes a wireless configuration for the display device and the mouse device to operate in the wireless docking environment, based on the information received from the display device and the mouse device for the wireless docking environment. The steps of the flow diagram 400 represent computer code instructions stored in the RAM and/or ROM memory of the mobile device 100A, which when executed by the central processing units (CPU), carry out the functions of the example embodiments of the invention. The steps may be carried out in another order than shown and individual steps may be combined or separated into component steps. Additional steps may be inserted into this sequence. The steps of the example method are as follows.

Step 402: initiating, by a first device, a first out-of-band near-field communication connection with a second device by transmitting wireless communication signals including necessary power for providing the near-field communication connection;

Step 403: sending, by the first device, first in-band short-range communication connection parameters including one or more parameters indicating a timer value of an interval related to an expected completion time of a connection handover procedure, to the second device via the first out-of-band near-field communication connection;

Step 404: receiving, by the first device, first information from the second device for a wireless docking environment, via the first out-of-band near-field communication connection;

Step 406: initiating, by the first device, a second out-of-band near-field communication connection with a third device by transmitting wireless communication signals including necessary power for providing the near-field communication connection;

Step 407: sending, by the first device, second in-band short-range communication connection parameters to the third device via the out-of-band near-field communication connection;

Step 408: receiving, by the first device, second information from the third device for the wireless docking environment, via the second out-of-band near-field communication connection;

Step 410: composing an optimized wireless configuration for the second device and the third device to operate in the wireless docking environment, based on the information received from the second device and the third device for the wireless docking environment;

Step 412: establishing a first in-band short-range communication connection with the second device in accordance with the timer value interval, and establishing a second in-band short-range communication connection with the third device;

Step 414: applying the wireless configuration to the second device and to the third device to enable them to operate in the wireless docking environment; and Step 416: communicating with the wirelessly configured second device and third device in the wireless docking environment.

Figure 4C:
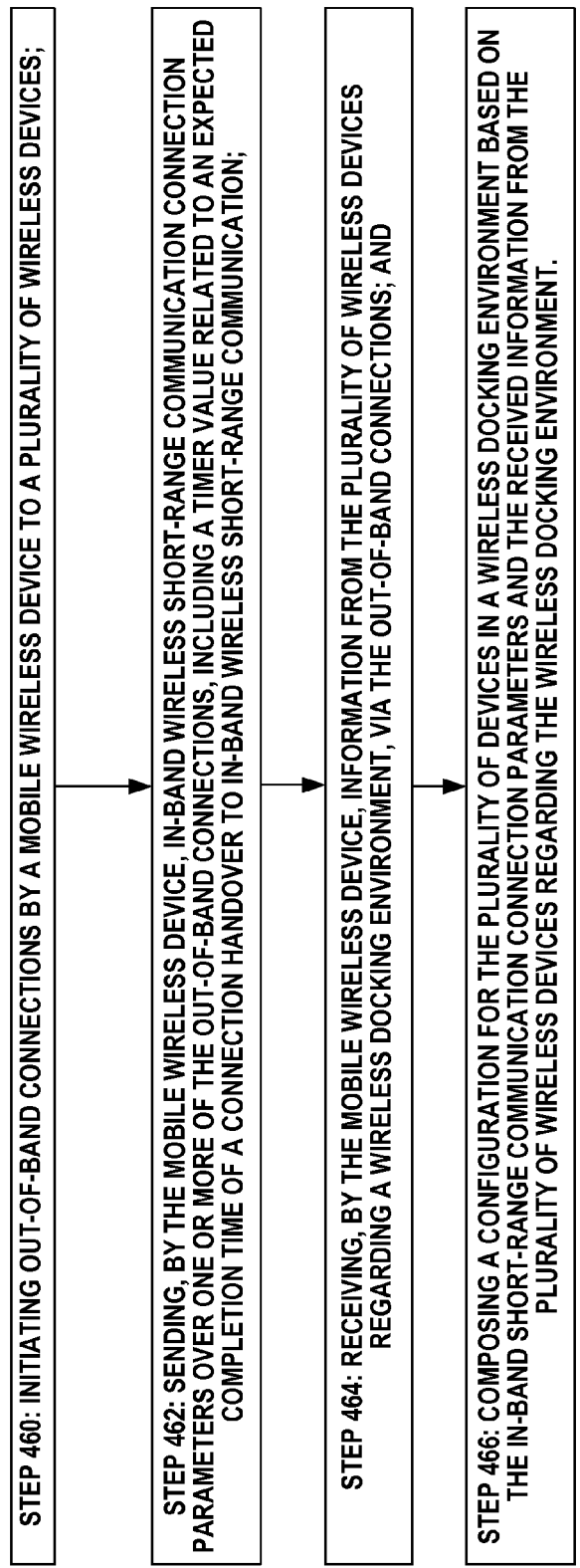
FIG. 4C is an example flow diagram 450 of operational steps of an example embodiment of the method carried out between the mobile device 100A and the plurality of peripheral devices: the display device 100B, the mouse device C, the key board 100D, and the printer 100E of FIG. 1.

FIG. 4C is an example flow diagram 450 of operational steps of an example embodiment of the method carried out between the mobile device 100A and the plurality of peripheral devices: the display device 100B, the mouse device C, the key board 100D, and the printer 100E of FIG. 1, to form a distributed wireless docking environment, from the point of view of the mobile device 100A. The steps of the flow diagram 400 represent computer code instructions stored in the RAM and/or ROM memory of the mobile device 100A, which when executed by the central processing units (CPU), carry out the functions of the example embodiments of the invention. The steps may be carried out in another order than shown and individual steps may be combined or separated into component steps. Additional steps may be inserted into this sequence. The steps of the example method are as follows.

Step 460: initiating out-of-band connections by a mobile wireless device to a plurality of wireless devices;

Step 462: sending, by the mobile wireless device, in-band wireless short-range communication connection parameters over one or more of the out-of-band connections, including a timer value related to an expected completion time of a connection handover to in-band wireless short-range communication;

Step 464: receiving, by the mobile wireless device, information from the plurality of wireless devices regarding a wireless docking environment, via the out-of-band connections; and Step 466: composing a configuration for the plurality of devices in a wireless docking environment based on the in-band short-range communication connection parameters and the information regarding the wireless docking environment.

In an alternate example embodiment of the invention, RFID transponders may be used instead of NFC Tags in mouse device C, keyboard device D, and printer device E, which may be the passive type or the active type, as provided in the Wi-Fi Protected Setup (WPS) standard. A passive RFID transponder requires no internal power source to communicate with an RFID reader, and is only active when it is near an RFID reader that energizes the transponder with a continuous radio frequency signal at a resonant frequency of the antenna. The small electrical current induced in the antenna by the continuous radio frequency signal provides enough power for the integrated circuit in the transponder to power up and transmit a modulated response, typically by backscattering the continuous carrier wave from the RFID reader. A passive RFID transponder may include writable electrically erasable, programmable, read-only memory (EEPROM) for storing data received from the RFID reader, which modulates the continuous carrier wave sent by the RFID reader. Reading distances for passive RFID transponders typically range from a few centimeters to a few meters, depending on the radio frequency and antenna design. By contrast, active RFID transponders require a power source to receive and transmit information with an RFID reader.

An example embodiment of the invention includes the following phases 1) through 6) to create a wireless docking environment:

Phase 1): Initiation of configuration: The user initiates a configuration sequence on mobile device 100A (assumption that user should initiate explicitly the setup of docking environment)

Phase 2): Peripheral selection: Then the user touches with mobile device 100A each peripheral that the user wants to add into docking environment, in arbitrary order. This is an 'NFC touch', i.e. the part of the mobile device 100A where the NFC antenna is located, is touched to the NFC tag or NFC antenna location of the peripheral.

a) Display 100B:
The Mobile device 100A exchanges WLAN/Wi-Fi settings and credentials over NFC and then Dynamic NFC Connection Handover is performed because both the Mobile device 100A and the Display 100B are NFC Devices.

b) Mouse 100C/Keyboard 100D:
Mobile device 100A reads Bluetooth configurations from the NFC tag and then Static NFC Connection Handover is performed because peripheral uses only an NFC tag.

c) Printer 100E
Mobile device 100A reads WLAN/Wi-Fi settings and credentials from the NFC tag and then Static NFC Connection Handover is performed because peripheral uses only an NFC tag.

In an embodiment of the invention, the Dynamic NFC Connection Handover message may include one or more parameters indicating a timer value of an interval related to an expected completion time of a connection handover procedure. The expected completion time may be a maximum time the second device may keep its radio on to enable accepting incoming connection requests, in order to save its battery. In another example embodiment of the invention, the timer value may also specify the minimum time after which the connection may be initiated by a third device, such as a wireless docking station. Normally a Bluetooth or Wi-Fi connection is established immediately after an NFC touch, but by sending the timer value to the peripheral device, the connection setup may be delayed, for example, until phase 5).

In an embodiment of the invention, during the NFC Connection Handover, additional information related to the Wireless Docking Protocol may be exchanged.

Phase 3): Stop the peripheral selection: Termination of peripheral selection phase may be based on:
Timeout after last NFC Connection Handover
User interface action in the mobile device Phase 4): Compose the wireless docking environment: Mobile device 100A, i.e. the docking controller, defines an optimal docking and connectivity for WLAN and Bluetooth configurations, based on the collected data in phase 2.

In an embodiment of the invention, there may be one shared Wi-Fi WLAN network between mobile device 100A, display 100B, and printer 100E, instead having two parallel Wi-Fi WLAN networks, for example the mobile device 100A communicating with the display 100B over a first WLAN and the mobile device 100A communicating with the printer 100E over a second WLAN.

In an embodiment of the invention, the mobile device 100A may be Group Owner of the Wi-Fi WLAN network when using a single WLAN network. A Group Owner in Wi-Fi acts as a Wi-Fi access point AP, where data between the clients of Wi-Fi is routed through the Group Owner. This is distinguished from the Bluetooth case, where Bluetooth connections are typically one-to-one, not parallel connections.

Phase 5): Configuration of peripherals: Mobile device creates (temporary) connections towards peripherals and configures them.

a) Display 100B:
Mobile device 100A creates a connection towards the display 100B by using WLAN configurations exchanged during phase 2a). In this phase, it may not matter which device is Group Owner of the Wi-Fi network.
Wireless docking protocol is executed over the Wi-Fi connection to exchange wireless docking environment related settings and possible new WLAN/Wi-Fi configurations. In the WLAN case, it is likely that WLAN configurations may need to be modified for optimized performance.

b) Mouse 100C/Keyboard 100D:
Mobile device 100A creates a connection towards mouse 100C and keyboard 100D by using Bluetooth configurations that were read during phase 2b).
Wireless docking protocol is executed over the Bluetooth connection to exchange wireless docking environment related settings and possible new Bluetooth configurations. In the Bluetooth case, it is unlikely that the Bluetooth configurations would need to be modified.

c) Printer 100E:
Mobile device 100A creates a connection towards printer 100E by using WLAN configurations that were read during phase 2c). In this phase, it may not matter which device is Group Owner of the Wi-Fi network.
Wireless docking protocol is executed over the Wi-Fi connection to exchange wireless docking environment related settings and possible new WLAN/Wi-Fi configurations.

In an embodiment of the invention, connections and configurations may be done one-by-one for each peripheral. In another embodiment of the invention, parallel connections may be possible to reduce delays in configuring the docking environment.

Phase 6): Switch to use final connectivity parameters. If connectivity parameters for a peripheral has been modified, then the current connection is terminated and then a new final connection is established:

In the Wi-Fi case, a point-to-point (P2P) Invitation mechanism may be used. Mobile device 100A may send the invitation after completion of phase 5) for each peripheral requiring a new Wi-Fi connection, The creation of the wireless docking environment in phases 1) to 6) needs to be done only once, unless changes are desired for docking environment. The next time that mobile device A enters into the configured docking environment, phases 1) to 6) need not be repeated.

Example Centralized Wireless Docking Environments

Figure 5:
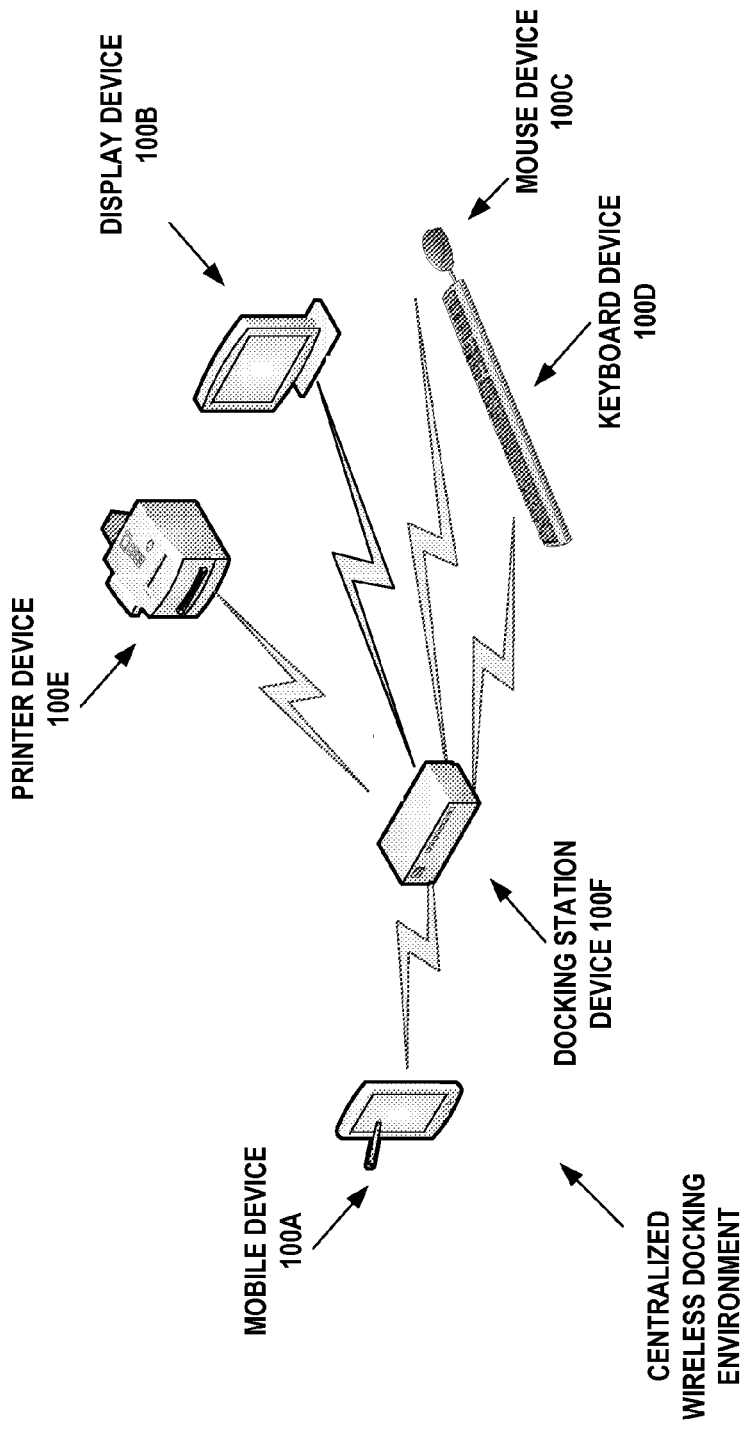
FIG. 5 is a wireless network diagram of an example embodiment of a centralized wireless docking environment, wherein mobile device A is the dockee and docking station F is the docking controller in the centralized wireless docking environment with display B, mouse C, Keyboard D, and printer E.

FIG. 5 is a wireless network diagram of an example embodiment of a centralized wireless docking environment, wherein mobile device A is the dockee and docking station F is the docking controller in the centralized wireless docking environment with display B, mouse C, Keyboard D, and printer E.

The Mobile Device 100A is the dockee. The Mobile Device 100A supports WLAN (Wi-Fi), Bluetooth, NFC (NFC Device) and Docking Protocol.

The Docking Station 100F acts as the docking controller. The Docking Station 100F supports WLAN (Wi-Fi), Bluetooth, NFC (NFC Device) and Docking Protocol.

The Display device 100B, a peripheral, supports Video and audio over Wi-Fi, NFC (NFC Device) and Docking Protocol.

The Mouse device 100C, a peripheral, supports Bluetooth NFC (NFC tag) and Docking Protocol.

The Keyboard device 100D, a peripheral, supports Bluetooth; NFC (NFC tag) and Docking Protocol.

The Printer device E, a peripheral, supports Printing over Wi-Fi, NFC (NFC tag) and Docking Protocol.

Figure 6:
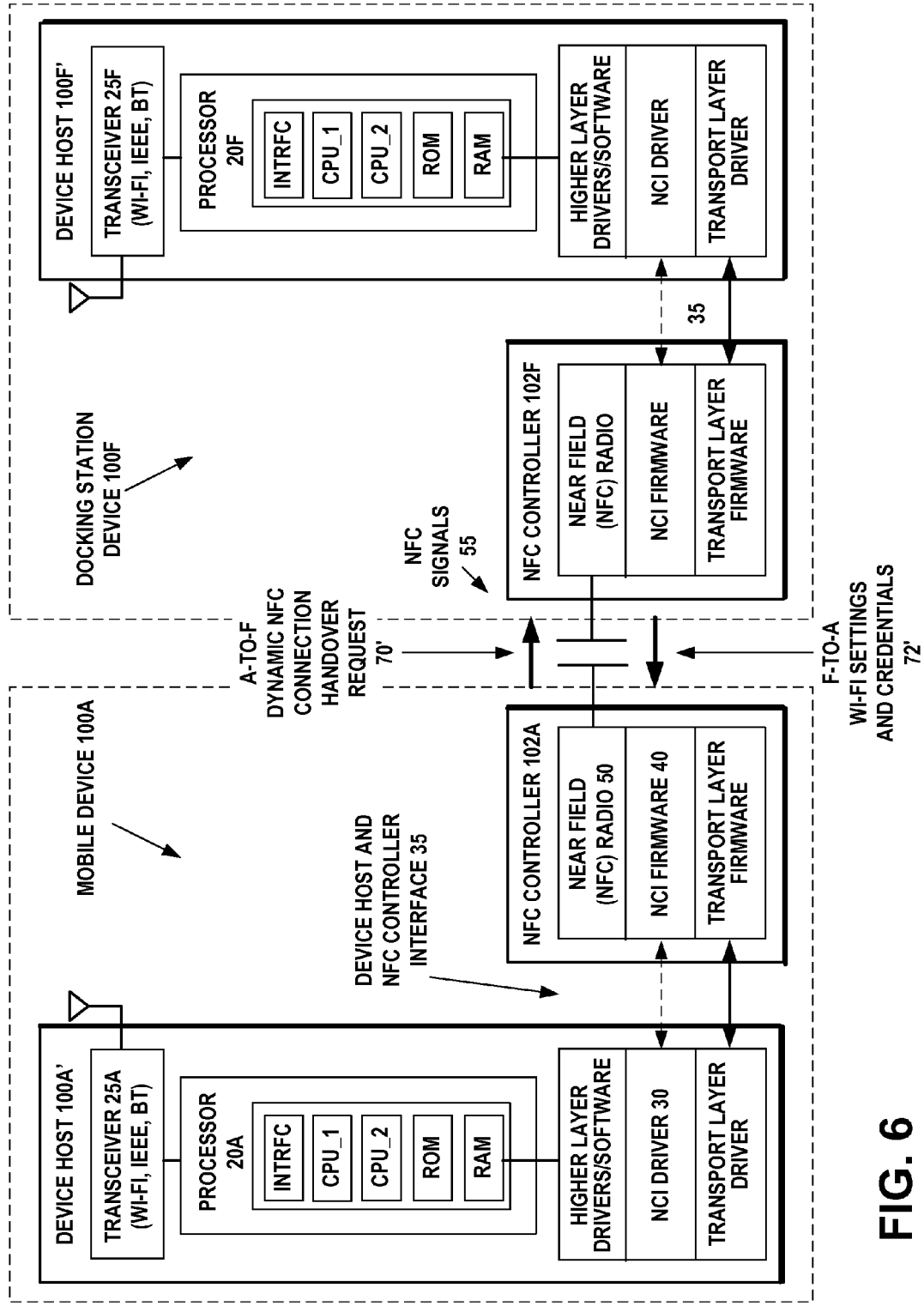
FIG. 6 is an example embodiment of the centralized wireless docking environment of FIG. 5, illustrating an example of the mobile device A comprising a mobile device host and its associated NFC controller sending a dynamic NFC connection handover request to an example of the wireless docking station device F comprising a docking station device host and its associated NFC controller, performing a dynamic handover procedure to a Wi-Fi short-range communication connection, by using near-field communication (NFC) signals in an out-of-band device-to-device connection setup, according to an embodiment of the present invention.

FIG. 6 is an example embodiment of the centralized wireless docking environment of FIG. 5, illustrating an example of the mobile device 100A comprising a mobile device host 100A' and its associated NFC controller 102A sending a dynamic NFC connection handover request 70' to an example of the wireless docking station device 100F comprising a docking station device host 100F' and its associated NFC controller 102F, performing a dynamic handover procedure to a Wi-Fi short-range communication connection, by using near-field communication (NFC) signals 55 in an out-of-band device-to-device connection setup, according to an embodiment of the present invention.

Figure 7:
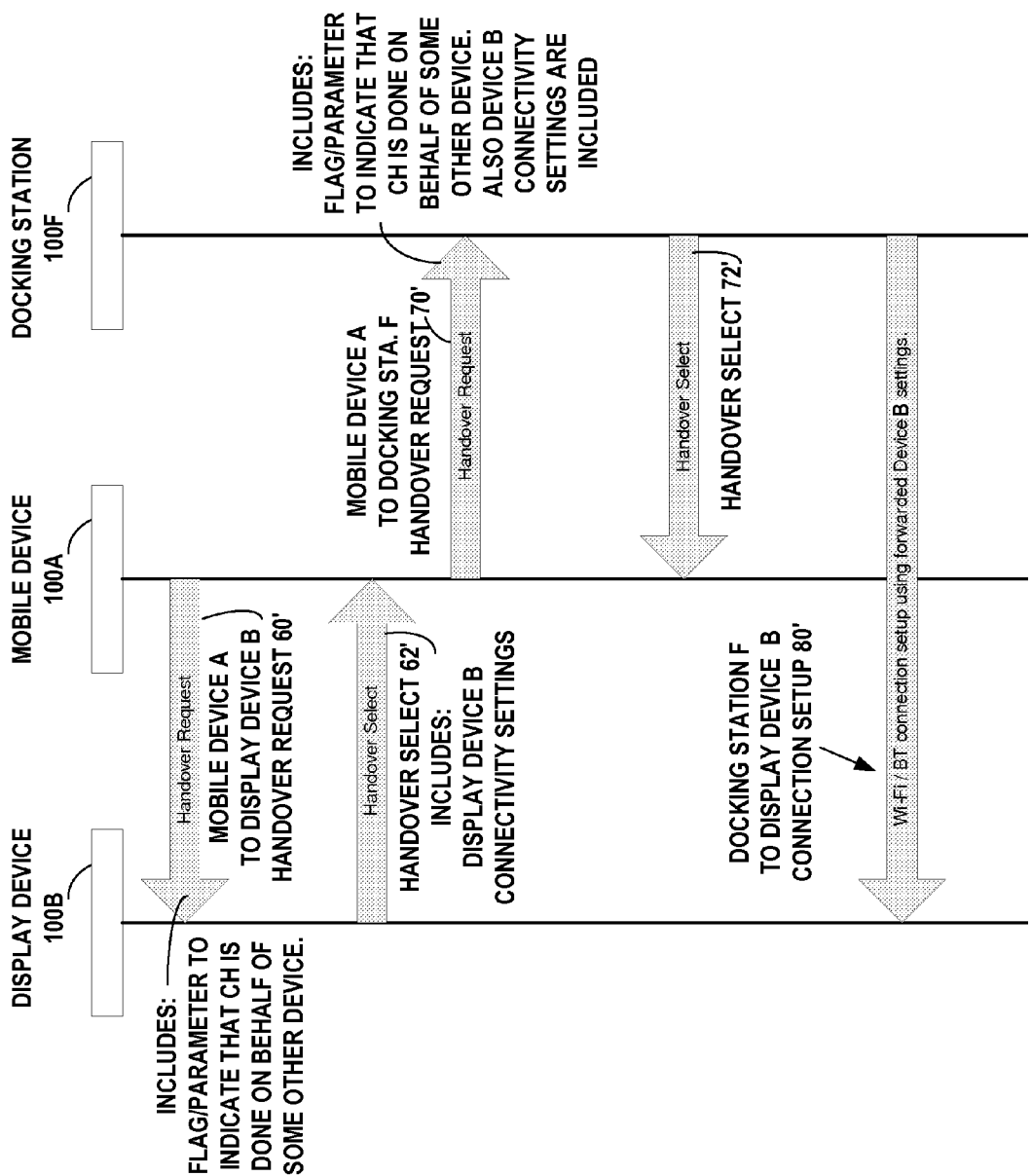
FIG. 7 is an example embodiment of a sequence diagram of the mobile device A, the display device B, and the docking station F FIGS. 2A and 6, forming the centralized wireless docking environment of FIG. 5, according to an embodiment of the present invention.

FIG. 7 is an example embodiment of a sequence diagram of the mobile device 100A, the display device 100B, and the docking station 100F of FIGS. 2A and 6, forming the centralized wireless docking environment of FIG. 5, according to an embodiment of the present invention.

The mobile device 100A sends to display device 100B, short-range communication connection parameters in a handover request 60' that includes a timer value related to an expected completion time of a connection handover procedure and an indication that a third device, the wireless docking station 100F, will perform a connection setup with the display device 100B, via the NFC out-of-band near-field communication connection. The display device 100B replies with a handover select message 62' that includes information for a wireless docking environment and the connectivity settings of the display device 100B. The display device 100B will wait for an interval based on the timer value, until the wireless docking station 100F performs a connection setup with the display device 100B.

The mobile device 100A sends to the wireless docking station 100F, second short-range communication connection parameters in a second handover request 70' that includes a timer value related to the expected completion time of a connection handover procedure, the information from the display device 100B for a wireless docking environment, and the connectivity settings of the display device 100B, via the second NFC out-of-band near-field communication connection, to enable the wireless docking station 100F to setup a short-range communication connection with the display device 100B according to the second short-range communication connection parameters, after the expected completion time. The wireless docking station 100F replies with a handover select message 72' that includes Wi-Fi settings and credentials. The wireless docking station 100F may later perform a connection setup 80' to establish the Wi-Fi short-range communication connection with the display device 100B, in accordance with the timer value interval.

FIG. 8A1 is an example embodiment NFC handover request message 60' format from the mobile device 100A to the display device 100B with the additional WLAN parameters including one or more parameters indicating a timer value related to an expected completion time of a connection handover procedure and an indication that a third device, the docking station 100F, will perform a connection setup with the display device 100B in the carrier configuration NDEF record, sent by the mobile device 100A over the NFC link 55, according to an embodiment of the present invention.

FIG. 8A2 is an example embodiment NFC handover request message 60' format from the mobile device 100A to the display device 100B with the additional WLAN parameters including one or more parameters indicating the timer value and indication of the third device setup initiation in the auxiliary data NDEF record, sent by the mobile device 100A over the NFC link 55, according to an embodiment of the present invention.

FIG. 8B1 is an example embodiment NFC handover request message 70' format from the mobile device 100A to the wireless docking station device 100F with the additional WLAN parameters including one or more parameters indicating a timer value related to an expected completion time of a connection handover procedure and connectivity settings of the display device 100B that the wireless docking station device 100F will later use to perform a connection setup 80' with the display device 100B in the carrier configuration NDEF record, sent by the mobile device 100A over the NFC link 55, according to an embodiment of the present invention.

FIG. 8B2 is an example embodiment NFC handover request message 70' format from the mobile device 100A to the wireless docking station device 100F with the additional WLAN parameters including one or more parameters indicating the timer value and connectivity settings of device in the auxiliary data NDEF record, sent by the mobile device 100A over the NFC link 55, according to an embodiment of the present invention.

FIG. 9 is an example flow diagram 900 of operational steps of an example embodiment of the method carried out between the mobile device 100A, the display device 100B, and the docking station 100F of FIG. 2A and FIG. 6 to form a centralized wireless docking environment, operating in the example sequence shown in FIG. 7, from the point of view of the mobile device 100A. The mobile device 100A sends to display device 100B, short-range communication connection parameters including one or more parameters indicating a timer value related to an expected completion time of a connection handover procedure and an indication that a third device 100F will perform a connection setup with the second device 100B, via the NFC out-of-band near-field communication connection. The steps of the flow diagram represent computer code instructions stored in the RAM and/or ROM memory of the mobile device 100A, which when executed by the central processing units (CPU), carry out the functions of the example embodiments of the invention. The steps may be carried out in another order than shown and individual steps may be combined or separated into component steps. Additional steps may be inserted into this sequence. The steps of the example method are as follows.

Step 902: initiating, by a first device, an out-of-band near-field communication connection with a second device by transmitting wireless communication signals including necessary power for providing the near-field communication connection;

Step 904: sending, by the first device, first in-band short-range communication connection parameters including one or more parameters indicating a timer value related to an expected completion time of a connection handover procedure and an indication that a third device will perform a connection setup with the second device, to the second device via the out-of-band near-field communication connection;

Step 906: receiving, by the first device, information from the second device for a wireless docking environment and connectivity settings of the second device via the out-of-band near-field communication connection;

Step 908: initiating, by the first device, a second out-of-band near-field communication connection with the third device by transmitting wireless communication signals including necessary power for providing the near-field communication connection; and Step 910: sending second in-band short-range communication connection parameters including one or more parameters indicating a timer value related to the expected completion time of a connection handover procedure, the information from the second device for a wireless docking environment, and the connectivity settings of the second device, to the third device via the second out-of-band near-field communication connection, to enable the third device to setup an in-band short-range communication connection with the second device according to the second in-band short-range communication connection parameters, after the expected completion time.

Figure 10:
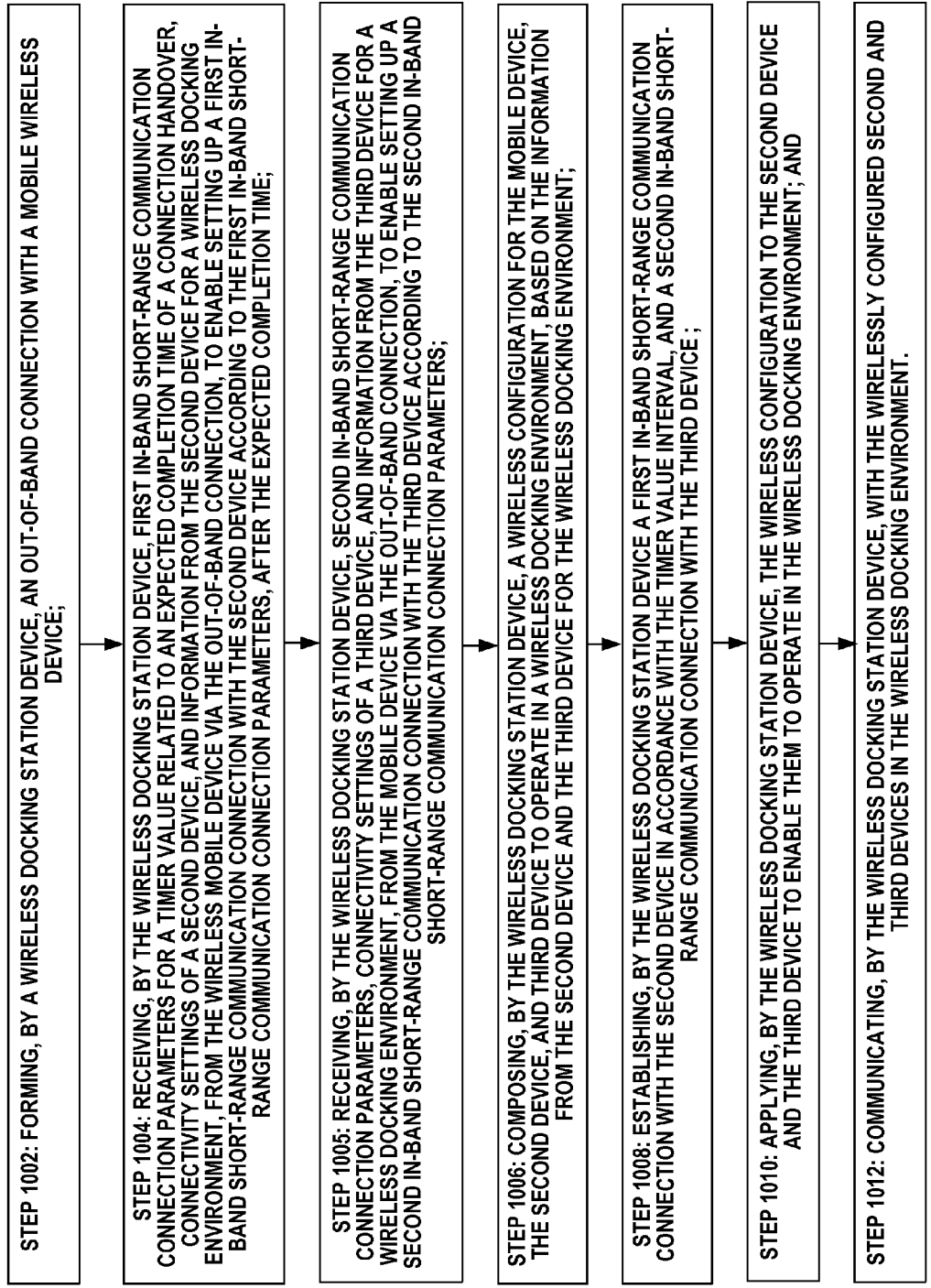
FIG. 10 is an example flow diagram 1000 of operational steps of an example method embodiment of the invention performed by docking station device 100F for centralized docking at a docking station device 100F of FIG. 5.

FIG. 10 is an example flow diagram 1000 of operational steps of an example method embodiment of the invention performed by docking station device 100F for centralized docking, from the point of view of the docking station device 100F of FIG. 5. The steps of the flow diagram represent computer code instructions stored in the RAM and/or ROM memory of the wireless docking station device 100F, which when executed by the central processing units (CPU), carry out the functions of the example embodiments of the invention. The steps may be carried out in another order than shown and individual steps may be combined or separated into component steps. Additional steps may be inserted into this sequence. The steps of the example method are as follows.

Step 1002: forming, by a wireless docking station device, an out-of-band connection with a mobile wireless device;

Step 1004: receiving, by the wireless docking station device, first in-band short-range communication connection parameters for a timer value related to an expected completion time of a connection handover, connectivity settings of a second device, and information from the second device for a wireless docking environment, from the wireless mobile device via the out-of-band connection, to enable setting up a first in-band short-range communication connection with the second device according to the first in-band short-range communication connection parameters, after the expected completion time;

Step 1005: receiving, by the wireless docking station device, second in-band short-range communication connection parameters, connectivity settings of a third device, and information from the third device for a wireless docking environment, from the mobile device via the out-of-band connection, to enable setting up a second in-band short-range communication connection with the third device according to the second in-band short-range communication connection parameters;

Step 1006: composing, by the wireless docking station device, a wireless configuration for the mobile device, the second device, and third device to operate in a wireless docking environment, based on the information from the second device and the third device for the wireless docking environment;

Step 1008: establishing, by the wireless docking station device a first in-band short-range communication connection with the second device in accordance with the timer value interval, and a second in-band short-range communication connection with the third device;

Step 1010: applying, by the wireless docking station device, the wireless configuration to the second device and the third device to enable them to operate in the wireless docking environment; and Step 1012: communicating, by the wireless docking station device, with the wirelessly configured second and third devices in the wireless docking environment.

Figure 11:
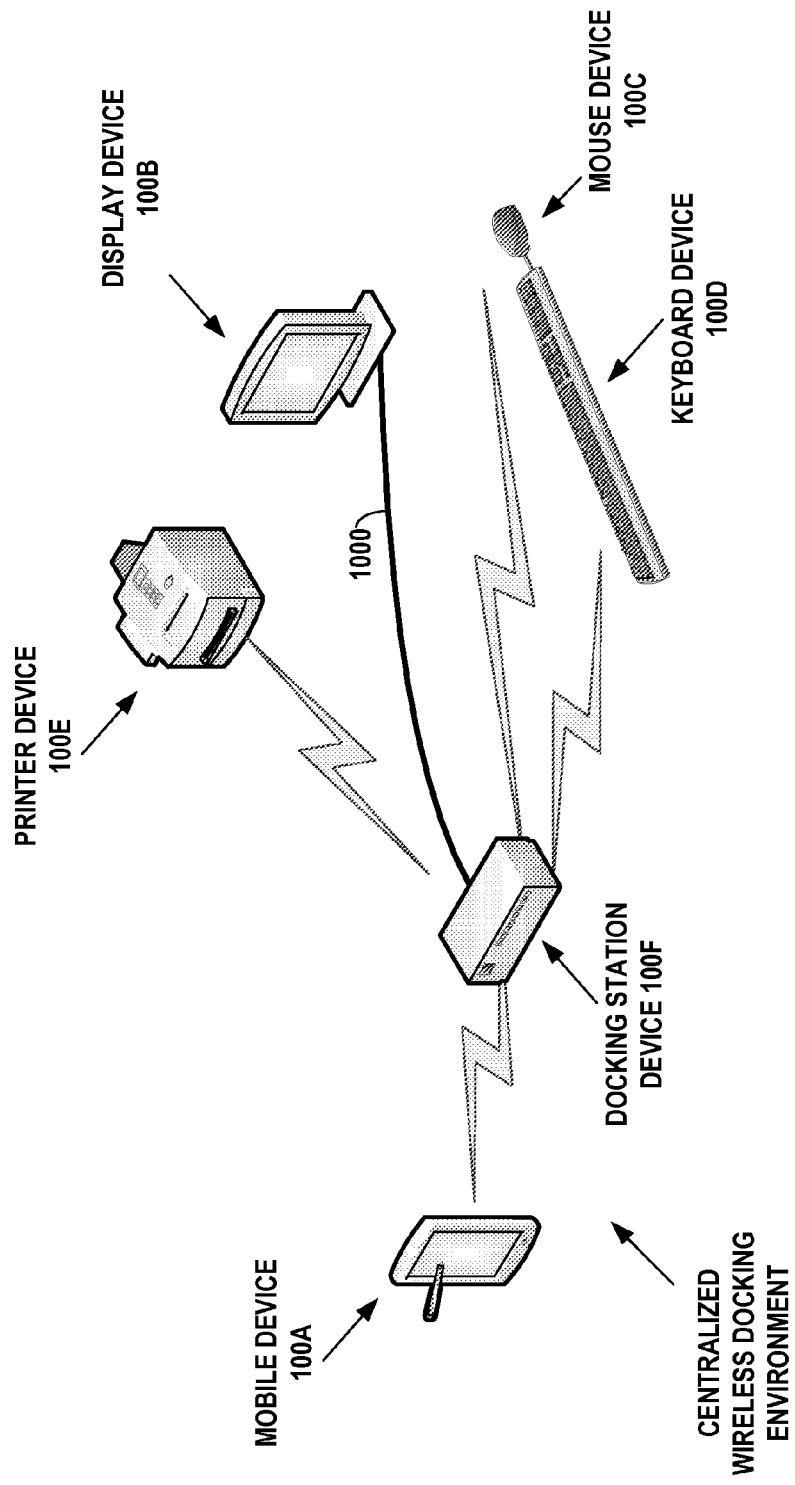
FIG. 11 is a wireless network diagram of an example embodiment of a centralized wireless docking environment, wherein mobile device A is the dockee and docking station F is the docking controller in the centralized wireless docking environment with display B connected by a cable to the docking station F and the mouse C, Keyboard D, and printer E connected wirelessly to the docking station F.

Example Centralized Wireless Docking Environments Including Cable Connections to the Docking Station FIG. 11 is a wireless network diagram of an example embodiment of a centralized wireless docking environment, wherein mobile device A is the dockee and docking station F is the docking controller in the centralized wireless docking environment, with display B connected by cable 1000 to the docking station F and the mouse C, Keyboard D, and printer E connected wirelessly to the docking station F.

The Mobile Device 100A is the dockee. The Mobile Device 100A supports WLAN (Wi-Fi), Bluetooth, NFC (NFC Device) and Docking Protocol.

The Docking Station 100F acts as the docking controller. The Docking Station 100F supports WLAN (Wi-Fi), Bluetooth, NFC (NFC Device) and Docking Protocol.

The Display device 100B, a peripheral, is a legacy device connected with wired connection cable 1000 to Docking Station 100F, using for example, High-Definition Multimedia Interface (HDMI), The Mouse device 100C, a peripheral, supports Bluetooth NFC (NFC tag) and Docking Protocol.

The Keyboard device 100D, a peripheral, supports Bluetooth; NFC (NFC tag) and Docking Protocol.

The Printer device E, a peripheral, supports Printing over Wi-Fi, NFC (NFC tag) and Docking Protocol.

An example embodiment of the invention includes the following phases 1) through 6) to create a wireless docking environment:

Phase 1) Initiation of configuration: The user initiates a configuration sequence on mobile device 100A (assumption that user should initiate explicitly the setup of docking environment).

Phase 2) Peripheral selection: Then user touches with mobile device 100A each peripheral that the user wants to add into docking environment, in arbitrary order. This is an 'NFC touch', i.e. the part of the mobile device 100A where the NFC antenna is located, is touched to the NFC tag or NFC antenna location of the peripheral.

a) Docking Station 100F:
The Mobile device 100A exchanges WLAN/Wi-Fi settings and credentials over NFC and then Dynamic NFC Connection Handover is performed because both Mobile device 100A and Docking Station 100F are NFC Devices.

b) Mouse 100C/Keyboard 100D:
Mobile device 100A reads Bluetooth configurations from the NFC tag and then Static NFC Connection Handover is performed because peripheral uses only an NFC tag.

c) Printer 100E
Mobile device 100A reads WLAN/Wi-Fi settings and credentials from the NFC tag and then Static NFC Connection Handover is performed because peripheral uses only an NFC tag.

Even though the Docking Station is a docking controller, due to the mobility of the mobile device 100A, it may be convenient for the mobile device 100A to perform the NFC touch and the selection of peripherals and the Docking Station 100F.

Phase 3) Stop the peripheral selection: Termination of peripheral selection phase could be based on;

Timeout after last NFC Connection Handover

User interface action in the mobile device

Phase 4) Compose the wireless docking environment: In this example, mobile device 100, which is the Dockee, may forward the collected data in step 2 to Docking Station 100F. Then Docking Station 100F decides an optimal docking environment and connectivity settings. During the NFC touch phase 2), a device type exchange may be made, so that mobile device 100A is aware of the presence of the Docking Station 100F.

In an embodiment of the invention, there may be one shared Wi-Fi WLAN network between mobile device 100A, Docking Station 100F, and printer 100E, instead having two parallel Wi-Fi WLAN networks, for example the mobile device 100A communicating with the Docking Station 100F over a first WLAN and the mobile device 100A communicating with the printer 100E over a second WLAN.

In an embodiment of the invention, the Docking station 100F may be Group Owner of the Wi-Fi WLAN network when using a single WLAN network. A Group Owner in Wi-Fi acts as a Wi-Fi access point AP, where data between the clients of Wi-Fi is routed through the Group Owner. This is distinguished from the Bluetooth case, where Bluetooth connections are typically one-to-one, not parallel connections. In an embodiment of the invention, a Wi-Fi connection may be used in this phase between mobile device 100A and Docking Station 100F to exchange collected data.

Phase 5) Configuration of peripherals: Mobile device creates (temporary) connections towards peripherals and configures them.

a) Mobile device 100A:

Docking Station 100F may configure mobile device 100A by using the connection created in phase 4).

Wireless docking protocol is executed over Wi-Fi connection to exchange wireless docking environment related settings and possible new WLAN/Wi-Fi configurations. In the WLAN case it may be likely that WLAN configurations may need to be modified to optimize performance.

b) Mouse 100C/Keyboard 100D:

Docking Station 100F creates a connection towards mouse 100C and keyboard 100D by using Bluetooth configurations that were read during phase 2b).

Wireless docking protocol is executed over the Bluetooth connection to exchange wireless docking environment related settings and possible new Bluetooth configurations. In the Bluetooth case, it is unlikely that the Bluetooth configurations would need to be modified.

c) Printer 100E:

Docking Station 100F creates a connection towards printer 100E by using WLAN configurations that were read during phase 2c). In this phase, it may not matter which device is Group Owner of the Wi-Fi network.

Wireless docking protocol is executed over the Wi-Fi connection to exchange wireless docking environment related settings and possible new WLAN/Wi-Fi configurations.

In an embodiment of the invention, connections and configurations may be done one-by-one for each peripheral. In another embodiment of the invention, parallel connections may be possible to reduce delays in configuring the docking environment.

Phase 6) Switch to use final connectivity parameters. If connectivity parameters for a peripheral has been modified, then the current connection is terminated and then a new final connection is established:

In the Wi-Fi case, a point-to-point (P2P) Invitation mechanism may be used. Docking Station 100F may send the invitation after completion of phase 5) for each peripheral requiring a new Wi-Fi connection, In an embodiment of the invention, after normal connection handover in phase 2), i.e. the establishment of a WLAN or Bluetooth bearer, there may not much need to send additional information over the connection, and thus the Wireless Docking Protocol may make its initial handshake and status exchange and then close the connection.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:

initiating out-of-band connections by a mobile wireless device to a plurality of wireless devices;

sending, by the mobile wireless device, in-band wireless short-range communication connection parameters to two or more of the plurality of wireless devices over one or more of the out-of-band connections, including a timer value related to an expected completion time of a connection handover to in-band wireless short-range communication;

receiving, by the mobile wireless device, information from the plurality of wireless devices regarding a wireless docking environment, via the out-of-band connections; and composing a configuration for the plurality of devices in the wireless docking environment based on the in-band wireless short-range communication connection parameters and the information regarding the wireless docking environment.

2. The method of claim 1, wherein the out-of-band connections are based on an NFC Forum logical link control protocol and the mobile wireless device and the plurality of wireless devices use an NFC Forum connection handover protocol to exchange the in-band wireless short-range communication connection parameters.

3. The method of claim 2, wherein the in-band wireless short-range communication is via a Wi-Fi wireless network and a carrier configuration record includes an IEEE 802.11 service set identifier, authentication and encryption type deployed by the Wi-Fi wireless network, a network key that a wireless station needs to authenticate with the Wi-Fi wireless network, and a MAC address of a device receiving the configuration, if known.

4. The method of claim 2, wherein the in-band wireless short-range communication is via a Bluetooth wireless network and a carrier configuration record includes a Bluetooth piconet identifier, authentication and encryption type deployed by the Bluetooth wireless network, a network key that a wireless station needs to authenticate with the Bluetooth wireless network, and an address of a device receiving the configuration, if known.

5. The method of claim 1, wherein the mobile wireless device performs the step of composing the optimal wireless configuration for the plurality of wireless devices to enable them to operate in the wireless docking environment, wherein the wireless docking environment is a distributed wireless docking environment.

6. The method of claim 5, which further comprises:
establishing by the wireless mobile device, in-band wireless short-range communication connections with the plurality of wireless devices, based on the in-band wireless short-range communication connection parameters and the received information;
applying by the mobile wireless device, the optimal wireless configuration to the plurality of wireless devices, via the in-band wireless short-range communication connections, to enable the plurality of wireless devices to operate in the wireless docking environment; and
communicating by the mobile wireless device, with the plurality of wireless devices in the wireless docking environment, via the in-band wireless short-range communication connections.

7. A method, comprising:
initiating out-of-band connections by a mobile wireless device to a plurality of wireless devices;
sending, by the mobile wireless device, in-band wireless short-range communication connection parameters to two or more of the plurality of wireless devices over one or more of the out-of-band connections, including a timer value related to an expected completion time of a connection handover to in-band wireless short-range communication;
receiving, by the mobile wireless device, information from the plurality of wireless devices regarding a wireless docking environment, via the out-of-band connections;
composing a configuration for the plurality of devices in the wireless docking environment based on the in-band wireless short-range communication connection parameters and the information regarding the wireless docking environment;
sending, by the mobile wireless device, an indication that another device will perform a connection setup with one or more of the plurality of wireless devices, via the out-of-band connections;
receiving, by the mobile wireless device, connectivity settings from the one or more of the plurality of wireless devices, via the out-of-band connection;
initiating, by the mobile wireless device, another out-of-band connection with the another device; and
sending by the mobile wireless device, additional in-band wireless short-range communication connection parameters including one or more parameters indicating the timer value related to the expected completion time of the connection handover, the information from the plurality of wireless devices for the wireless docking environment, and the connectivity settings, to the another device via the another out-of-band connection, to enable the another device to setup in-band wireless short-range communication connections with the plurality of wireless devices according to the additional in-band wireless short-range communication connection parameters, after the expected completion time.

8. A device, comprising:
at least one processor;
at least one memory including computer program code;
the at least one memory and the computer program code configured to, with the at least one processor, cause the device at least to:
initiate by the device as a mobile wireless device, out-of-band connections to a plurality of wireless devices;
send, by the mobile wireless device, in-band wireless short-range communication connection parameters to two or more of the plurality of wireless devices over one or more of the out-of-band connections, including a timer value related to an expected completion time of a connection handover to in-band wireless short-range communication;
receive, by the mobile wireless device, information from the plurality of wireless devices regarding a wireless docking environment, via the out-of-band connections; and
compose a configuration for the plurality of wireless devices in the wireless docking environment based on the in-band wireless short-range communication connection parameters and the information regarding the wireless docking environment.

9. The device of claim 8, wherein the out-of-band connections are based on an NFC Forum logical link control protocol and the mobile wireless device and the plurality of wireless devices use an NFC Forum connection handover protocol to exchange the in-band wireless short-range communication connection parameters.

10. The device of claim 9, wherein the in-band wireless short-range communication is via a Wi-Fi wireless network and a carrier configuration record includes an IEEE 802.11 service set identifier, authentication and encryption type deployed by the Wi-Fi wireless network, a network key that a wireless station needs to authenticate with the Wi-Fi wireless network, and a MAC address of a device receiving the configuration, if known.

11. The device of claim 9, wherein the in-band wireless short-range communication is via a Bluetooth wireless network and a carrier configuration record includes a Bluetooth piconet identifier, authentication and encryption type deployed by the Bluetooth wireless network, a network key that a wireless station needs to authenticate with the Bluetooth wireless network, and an address of a device receiving the configuration, if known.

12. The device of claim 8, wherein the mobile wireless device performs the step of composing the optimal wireless configuration for the plurality of wireless devices to enable them to operate in the wireless docking environment, wherein the wireless docking environment is a distributed wireless docking environment.

13. The device of claim 12, which further comprises:
the at least one memory and the computer program code configured to, with the at least one processor, cause the device at least to:
establish by the mobile wireless device, in-band wireless short-range communication connections with the plurality of wireless devices, based on the in-band wireless short-range communication connection parameters and the received information;
apply by the mobile wireless device, the optimal wireless configuration to the plurality of wireless devices, via the in-band wireless short-range communication connections, to enable the plurality of wireless devices to operate in the wireless docking environment; and
communicate by the mobile wireless device, with the plurality of wireless devices in the wireless docking environment, via the in-band wireless short-range communication connections.

14. A device, comprising:
at least one processor;
at least one memory including computer program code;
the at least one memory and the computer program code configured to, with the at least one processor, cause the device at least to:
initiate by the device as a mobile wireless device, out-of-band connections to a plurality of wireless devices;
send, by the mobile wireless device, in-band wireless short-range communication connection parameters to two or more of the plurality of wireless devices over one or more of the out-of-band connections, including a timer value related to an expected completion time of a connection handover to in-band wireless short-range communication;
receive, by the mobile wireless device, information from the plurality of wireless devices regarding a wireless docking environment, via the out-of-band connections;
compose a configuration for the plurality of wireless devices in the wireless docking environment based on the in-band wireless short-range communication connection parameters and the information regarding the wireless docking environment;
send, by the mobile wireless device, an indication that another device will perform a connection setup with one or more of the plurality of wireless devices, via the out-of-band connections;
receive, by the mobile wireless device, connectivity settings from the one or more of the plurality of wireless devices, via the out-of-band connections;
initiate, by the mobile wireless device, another out-of-band connection with the another device; and
send by the mobile wireless device, additional in-band wireless short-range communication connection parameters including one or more parameters indicating the timer value related to the expected completion time of the connection handover, the information from the plurality of wireless devices for the wireless docking environment, and the connectivity settings, to the another device via the another out-of-band connection, to enable the another device to setup in-band wireless short-range communication connections with the plurality of wireless devices according to the additional in-band wireless short-range communication connection parameters, after the expected completion time.

15. The device of claim 14, wherein the out-of-band connections are based on an NFC Forum logical link control protocol and the mobile wireless device, the plurality of wireless devices, and the another device use an NFC Forum connection handover protocol to exchange the in-band wireless short-range communication connection parameters.

16. A device, comprising:
at least one processor;
at least one memory including computer program code;
the at least one memory and the computer program code configured to, with the at least one processor, cause the device at least to:
initiate by the device as a mobile wireless device, out-of-band connections to a plurality of wireless devices;
send, by the mobile wireless device, in-band wireless short-range communication connection parameters to two or more of the plurality of wireless devices over one or more of the out-of-band connections, including a timer value related to an expected completion time of a connection handover to in-band wireless short-range communication;
receive, by the mobile wireless device, information from the plurality of wireless devices regarding a wireless docking environment, via the out-of-band connections;
compose a configuration for the plurality of wireless devices in the wireless docking environment based on the in-band wireless short-range communication connection parameters and the information regarding the wireless docking environment;
send, by the mobile wireless device, an indication that another device will perform a connection setup with one or more of the plurality of wireless devices, via the out-of-band connections;
receive, by the mobile wireless device, connectivity settings from the one or more of the plurality of wireless devices, via the out-of-band connections;
initiate, by the mobile wireless device, another out-of-band connection with the another device;
send by the mobile wireless device, additional in-band wireless short-range communication connection parameters including one or more parameters indicating the timer value related to the expected completion time of the connection handover, the information from the plurality of wireless devices for the wireless docking environment, and the connectivity settings, to the another device via the another out-of-band connection, to enable the another device to setup in-band wireless short-range communication connections with the plurality of wireless devices according to the additional in-band wireless short-range communication connection parameters, after the expected completion time;
wherein the out-of-band connections are based on an NFC Forum logical link control protocol and the mobile wireless device, the plurality of wireless devices, and the another device use an NFC Forum connection handover protocol to exchange the in-band wireless short-range communication connection parameters; and
wherein the in-band wireless short-range communication connection is via a Wi-Fi wireless network and the carrier configuration record includes an IEEE 802.11 service set identifier, authentication and encryption type deployed by the Wi-Fi wireless network, a network key that a wireless station needs to authenticate with the Wi-Fi wireless network, and a MAC address of a device receiving the configuration, if known.

17. A device, comprising:

at least one processor;

at least one memory including computer program code;

the at least one memory and the computer program code configured to, with the at least one processor, cause the device at least to:

initiate by the device as a mobile wireless device, out-of-band connections to a plurality of wireless devices;

send, by the mobile wireless device, in-band wireless short-range communication connection parameters to two or more of the plurality of wireless devices over one or more of the out-of-band connections, including a timer value related to an expected completion time of a connection handover to in-band wireless short-range communication;

receive, by the mobile wireless device, information from the plurality of wireless devices regarding a wireless docking environment, via the out-of-band connections;

compose a configuration for the plurality of wireless devices in the wireless docking environment based on the in-band wireless short-range communication connection parameters and the information regarding the wireless docking environment;

send, by the mobile wireless device, an indication that another device will perform a connection setup with one or more of the plurality of wireless devices, via the out-of-band connections;

receive, by the mobile wireless device, connectivity settings from the one or more of the plurality of wireless devices, via the out-of-band connections;

initiate, by the mobile wireless device, another out-of-band connection with the another device;

send by the mobile wireless device, additional in-band wireless short-range communication connection parameters including one or more parameters indicating the timer value related to the expected completion time of the connection handover, the information from the plurality of wireless devices for the wireless docking environment, and the connectivity settings, to the another device via the another out-of-band connection, to enable the another device to setup in-band wireless short-range communication connections with the plurality of wireless devices according to the additional in-band wireless short-range communication connection parameters, after the expected completion time;

wherein the out-of-band connections are based on an NFC Forum logical link control protocol and the mobile wireless device, the plurality of wireless devices, and the another device use an NFC Forum connection handover protocol to exchange the in-band wireless short-range communication connection parameters; and wherein the in-band wireless short-range communication connection is via a Bluetooth wireless network and the carrier configuration record includes a Bluetooth piconet identifier, authentication and encryption type deployed by the Bluetooth wireless network, a network key that a wireless station needs to authenticate with the Bluetooth wireless network, and an address of a device receiving the configuration, if known.

18. A computer program product comprising computer executable program code recorded on a computer readable storage medium, the computer executable program code comprising:

code for initiating out-of-band connections by a mobile wireless device to a plurality of wireless devices;

code for sending, by the mobile wireless device, in-band wireless short-range communication connection parameters to two or more of the plurality of wireless devices over one or more of the out-of-band connections, including a timer value related to an expected completion time of a connection handover to in-band wireless short-range communication;

code for receiving, by the mobile wireless device, information from the plurality of wireless devices regarding a wireless docking environment, via the out-of-band connections; and code for composing a configuration for the plurality of wireless devices in the wireless docking environment based on the in-band wireless short-range communication connection parameters and the information regarding the wireless docking environment.

19. A computer program product comprising computer executable program code recorded on a computer readable storage medium, the computer executable program code comprising:

code for initiating out-of-band connections by a mobile wireless device to a plurality of wireless devices;

code for sending, by the mobile wireless device, in-band wireless short-range communication connection parameters to two or more of the plurality of wireless devices over one or more of the out-of-band connections, including a timer value related to an expected completion time of a connection handover to in-band wireless short-range communication;

code for receiving, by the mobile wireless device, information from the plurality of wireless devices regarding a wireless docking environment, via the out-of-band connections; and code for composing a configuration for the plurality of wireless devices in the wireless docking environment based on the in-band wireless short-range communication connection parameters and the information regarding the wireless docking environment;

code for sending, by the mobile wireless device, an indication that another device will perform a connection setup with one or more of the plurality of wireless devices, via the out-of-band connections;

code for receiving, by the mobile wireless device, connectivity settings from the one or more of the plurality of wireless devices, via the out-of-band connections;

code for initiating, by the mobile wireless device, another out-of-band connection with the another device; and code for sending by the mobile wireless device, additional in-band wireless short-range communication connection parameters including one or more parameters indicating the timer value related to the expected completion time of the connection handover, the information from the plurality of wireless devices for the wireless docking environment, and the connectivity settings, to the another device via the another out-of-band connection, to enable the another device to setup in-band wireless short-range communication connections with the plurality of wireless devices according to the additional in-band wireless short-range communication connection parameters, after the expected completion time.

20. A method, comprising:

forming, by a wireless docking station device, an out-of-band connection with a mobile wireless device;

receiving, by the wireless docking station device, first in-band wireless short-range communication connection parameters for a timer value related to an expected completion time of a connection handover, connectivity settings of a second device, and information from the second device for a wireless docking environment, from the wireless mobile device via the out-of-band connection, to enable setting up a first in-band wireless short-range communication connection with the second device according to the first in-band wireless short-range communication connection parameters, after the expected completion time;

receiving, by the wireless docking station device, second in-band wireless short-range communication connection parameters, connectivity settings of a third device, and information from the third device for the wireless docking environment, from the mobile wireless device via the out-of-band connection, to enable setting up a second in-band wireless short-range communication connection with the third device according to the second in-band wireless short-range communication connection parameters;

composing, by the wireless docking station device, a wireless configuration for the mobile wireless device, the second device, and the third device to operate in the wireless docking environment, based on the information from the second device and the third device for the wireless docking environment;

establishing, by the wireless docking station device the first in-band wireless short-range communication connection with the second device in accordance with the timer value interval, and the second in-band wireless short-range communication connection with the third device;

applying, by the wireless docking station device, the wireless configuration to the second device and the third device to enable them to operate in the wireless docking environment; and communicating, by the wireless docking station device, with the wirelessly configured second and third devices in the wireless docking environment.

* * * * *